US008673398B2

(12) United States Patent
Fugitt et al.

(10) Patent No.: US 8,673,398 B2
(45) Date of Patent: Mar. 18, 2014

(54) METHOD FOR TREATING A SUBSTRATE

(75) Inventors: Gary P. Fugitt, Pittsboro, NC (US); Scott E. Ginther, Willow Spring, NC (US); John W. Stolarz, Circleville, OH (US); Robert W. Carlson, Raleigh, NC (US); Stanley H. McGrew, Jr., North Charleston, SC (US); Steven P. Metzler, Clayton, NC (US); Terrell J. Green, Raleigh, NC (US)

(73) Assignee: MeadWestvaco Corporation, Richmond, VA (US)

( * ) Notice: Subject to any disclaimer, the term of this patent is extended or adjusted under 35 U.S.C. 154(b) by 62 days.

(21) Appl. No.: 12/156,055

(22) Filed: May 29, 2008

(65) Prior Publication Data

US 2008/0268158 A1 Oct. 30, 2008

Related U.S. Application Data

(63) Continuation of application No. PCT/US2007/019917, filed on Sep. 13, 2007, which is a continuation-in-part of application No. PCT/US2007/004742, filed on Feb. 22, 2007.

(60) Provisional application No. 60/776,114, filed on Feb. 23, 2006, provisional application No. 60/957,478, filed on Aug. 23, 2007.

(51) Int. Cl.

| | |
|---|---|
| ***B32B 5/18*** | (2006.01) |
| ***B32B 5/02*** | (2006.01) |
| ***B32B 5/00*** | (2006.01) |

(52) U.S. Cl.

USPC ........ 427/288; 427/256; 427/331; 427/372.2; 427/373; 427/384; 427/394; 427/395; 427/396; 427/397

(58) Field of Classification Search

USPC .......................................................... 427/373

See application file for complete search history.

(56) References Cited

U.S. PATENT DOCUMENTS

| | | | |
|---|---|---|---|
| 1,366,520 | A | 1/1921 | Catini |
| 1,719,166 | A | 7/1929 | Bradner |

(Continued)

FOREIGN PATENT DOCUMENTS

| | | | |
|---|---|---|---|
| EP | 0218956 | A | 4/1987 |
| EP | 0514595 | A1 | 11/1992 |

(Continued)

OTHER PUBLICATIONS

Gane et al., "Void Space Structure of Compressible Polymer Spheres and Consolidated Calcium Carbonate Paper-Coating Formulations", Industrial & Engineering Chemistry Research, 1996, vol. 35 (5), pp. 1753-1764.*

(Continued)

*Primary Examiner* — Michael Cleveland
*Assistant Examiner* — Lisha Jiang
(74) *Attorney, Agent, or Firm* — MeadWestvaco Intellectual Property Group

(57) ABSTRACT

A method for treating a substrate is described. In accordance with one aspect, the method includes applying a polymer coating to a substrate, and bringing the polymer coating into contact with a heated surface in a pressure nip while the coating is still in a wet state. Optionally the polymer coating may include a crosslinkable material, and a crosslinking agent may be used to promote crosslinking. The polymer coating replicates the heated surface. A product produced in accordance with the described method is also disclosed. The product is characterized by having subsurface voids within the coating.

72 Claims, 19 Drawing Sheets

(56) References Cited

U.S. PATENT DOCUMENTS

| | | | | | |
|---|---|---|---|---|---|
| 2,029,273 | A | | 1/1936 | Bradner et al. | |
| 2,096,973 | A | | 10/1937 | Munsch | |
| 2,214,564 | A | | 9/1940 | Bradner et al. | |
| 2,214,565 | A | | 9/1940 | Bradner et al. | |
| 2,214,566 | A | | 9/1940 | Bradner et al. | |
| 2,245,045 | A | | 6/1941 | Bradner et al. | |
| 2,267,470 | A | | 12/1941 | Kabela et al. | |
| 2,304,818 | A | | 12/1942 | Grupe | |
| 2,304,819 | A | | 12/1942 | Grupe | |
| 2,316,202 | A | | 4/1943 | Warner | |
| 2,331,922 | A | | 10/1943 | Montgomery | |
| 2,337,013 | A | | 12/1943 | Bradner et al. | |
| 2,346,812 | A | | 4/1944 | Bradner | |
| 2,360,825 | A | | 10/1944 | Blickensderfer | |
| 2,360,919 | A | | 10/1944 | Warner | |
| 2,479,095 | A | | 8/1949 | Boyer | |
| 2,502,783 | A | | 4/1950 | Erickson | |
| 2,530,552 | A | | 11/1950 | Stoddard | |
| 2,533,532 | A | | 12/1950 | Stoddard | |
| 2,533,533 | A | | 12/1950 | Stoddard | |
| 2,555,266 | A | | 5/1951 | Bradner | |
| 2,568,288 | A | | 9/1951 | Montgomery | |
| 2,569,367 | A | | 9/1951 | Bradner et al. | |
| 2,569,368 | A | | 9/1951 | Bradner et al. | |
| 2,603,593 | A | | 7/1952 | Blickenaderfer | |
| RE23,637 | E | | 3/1953 | Montgomery | |
| 2,678,890 | A | | 5/1954 | Leighton | |
| 2,759,847 | A | | 8/1956 | Frost et al. | |
| 2,769,725 | A | | 11/1956 | Hart | |
| 2,775,226 | A | | 1/1957 | Hart | |
| 2,776,226 | A | | 1/1957 | Hart | |
| 2,780,563 | A | | 2/1957 | Frost et al. | |
| 2,800,946 | A | | 7/1957 | Steffan | |
| 2,810,966 | A | | 10/1957 | Bicknell | |
| 2,819,184 | A | | 1/1958 | Smith et al. | |
| 2,826,827 | A | | 3/1958 | Metz | |
| 2,849,334 | A | | 8/1958 | Hart | |
| 2,919,205 | A | | 12/1959 | Hart | |
| 2,934,467 | A | | 4/1960 | Bergstein | |
| 2,950,989 | A | | 8/1960 | Freeman | |
| 2,997,406 | A | | 8/1961 | Freeman | |
| 3,078,181 | A | | 2/1963 | Hart | |
| 3,081,182 | A | | 3/1963 | Mahoney | |
| 3,115,438 | A | | 12/1963 | Randall | |
| 3,356,517 | A | | 12/1967 | Nakajima et al. | |
| 3,377,192 | A | | 4/1968 | Kirk et al. | |
| 3,480,455 | A | | 11/1969 | Richardson | |
| 3,554,786 | A | | 1/1971 | Lieberman | |
| 3,702,779 | A | | 11/1972 | Fadner et al. | |
| 3,832,216 | A | | 8/1974 | Cressey | |
| 3,963,820 | A | * | 6/1976 | Blakey | 264/134 |
| 3,982,056 | A | | 9/1976 | Holder, Jr. | |
| 4,012,543 | A | | 3/1977 | Ranger et al. | |
| 4,024,313 | A | | 5/1977 | Cressey | |
| 4,048,380 | A | | 9/1977 | Blakey et al. | |
| 4,080,890 | A | | 3/1978 | Dreher | |
| 4,109,056 | A | | 8/1978 | Craig et al. | |
| 4,279,964 | A | | 7/1981 | Heller | |
| 4,305,756 | A | * | 12/1981 | Wiech, Jr. | 419/36 |
| 4,617,239 | A | | 10/1986 | Maruyama et al. | |
| 4,624,744 | A | * | 11/1986 | Vreeland | 162/206 |
| 4,749,445 | A | | 6/1988 | Vreeland | |
| 4,833,172 | A | | 5/1989 | Schwarz | |
| 5,033,373 | A | | 7/1991 | Brendel et al. | |
| 5,356,683 | A | | 10/1994 | Egolf et al. | |
| 5,360,826 | A | | 11/1994 | Egolf et al. | |
| 5,428,372 | A | | 6/1995 | Akiyama et al. | |
| 5,505,820 | A | | 4/1996 | Donigian et al. | |
| 5,593,939 | A | | 1/1997 | Saito et al. | |
| 5,631,076 | A | | 5/1997 | Hakomori | |
| 5,633,041 | A | | 5/1997 | Arrington | |
| 5,690,527 | A | | 11/1997 | Rutledge et al. | |
| 5,736,209 | A | | 4/1998 | Andersen et al. | |
| 5,836,242 | A | | 11/1998 | Aberg | |
| 5,976,235 | A | | 11/1999 | Andersen et al. | |
| 5,985,424 | A | | 11/1999 | DeMatte et al. | |
| 6,083,586 | A | | 7/2000 | Andersen et al. | |
| 6,114,022 | A | * | 9/2000 | Warner et al. | 428/315.5 |
| 6,168,857 | B1 | | 1/2001 | Andersen et al. | |
| 6,190,500 | B1 | | 2/2001 | Mohan et al. | |
| 6,200,404 | B1 | | 3/2001 | Andersen et al. | |
| 6,242,047 | B1 | | 6/2001 | Johnson et al. | |
| 6,274,001 | B1 | | 8/2001 | Mohan | |
| 6,287,424 | B1 | | 9/2001 | Mohan et al. | |
| 6,332,953 | B1 | | 12/2001 | Singh et al. | |
| 6,410,158 | B1 | | 6/2002 | Johnson et al. | |
| 6,485,611 | B2 | | 11/2002 | Bauer | |
| 6,497,790 | B2 | | 12/2002 | Mohan et al. | |
| 6,551,457 | B2 | | 4/2003 | Westman et al. | |
| 6,562,441 | B1 | | 5/2003 | Maeda et al. | |
| 6,689,432 | B2 | | 2/2004 | Kitamura et al. | |
| 6,726,810 | B2 | | 4/2004 | Bauer | |
| 6,777,039 | B2 | | 8/2004 | Koike et al. | |
| 6,802,938 | B2 | | 10/2004 | Mohan | |
| 6,991,706 | B2 | | 1/2006 | Lindsay et al. | |
| 7,014,311 | B2 | | 3/2006 | Kobayashi et al. | |
| 7,070,679 | B2 | | 7/2006 | Cason et al. | |
| 7,335,279 | B2 | | 2/2008 | Mohan et al. | |
| 7,906,187 | B2 | | 3/2011 | Bi et al. | |
| 2002/0040772 | A1 | | 4/2002 | Johnson et al. | |
| 2002/0060022 | A1 | | 5/2002 | Bauer | |
| 2002/0148584 | A1 | * | 10/2002 | Edwards et al. | 162/204 |
| 2003/0104175 | A1 | | 6/2003 | Koike et al. | |
| 2003/0113466 | A1 | * | 6/2003 | Frazzitta et al. | 427/428 |
| 2003/0198885 | A1 | * | 10/2003 | Tamagawa et al. | 430/124 |
| 2004/0043240 | A1 | * | 3/2004 | Goto et al. | 428/537.5 |
| 2004/0086666 | A1 | | 5/2004 | Yoshimura et al. | |
| 2004/0123966 | A1 | | 7/2004 | Altman et al. | |
| 2004/0146726 | A1 | | 7/2004 | Heckes et al. | |
| 2004/0200593 | A1 | | 10/2004 | Koskinen et al. | |
| 2004/0234802 | A1 | | 11/2004 | Hubinette et al. | |
| 2005/0194112 | A1 | | 9/2005 | Kurtz et al. | |
| 2005/0255259 | A1 | | 11/2005 | Nakane et al. | |
| 2006/0003113 | A1 | | 1/2006 | Nakano et al. | |
| 2006/0051527 | A1 | | 3/2006 | Okano | |
| 2006/0057358 | A1 | | 3/2006 | Miyake | |
| 2006/0060317 | A1 | | 3/2006 | Roding | |
| 2006/0060322 | A1 | | 3/2006 | Viljanmaa et al. | |
| 2006/0102303 | A1 | | 5/2006 | Lares | |
| 2006/0118256 | A1 | | 6/2006 | Lares et al. | |
| 2006/0124262 | A1 | | 6/2006 | Lares | |
| 2007/0004813 | A1 | | 1/2007 | Shelby et al. | |
| 2007/0256805 | A1 | | 11/2007 | Reed et al. | |
| 2008/0066848 | A1 | | 3/2008 | Feng et al. | |
| 2008/0081175 | A1 | | 4/2008 | Mukkamala | |
| 2008/0311416 | A1 | | 12/2008 | Kelly | |

FOREIGN PATENT DOCUMENTS

| | | | |
|---|---|---|---|
| EP | 0474494 | B1 | 12/1997 |
| EP | 0723612 | B1 | 7/1998 |
| EP | 0877119 | A3 | 2/1999 |
| EP | 0767851 | B1 | 9/1999 |
| EP | 0959176 | A | 11/1999 |
| EP | 1045068 | A3 | 12/2000 |
| EP | 1114735 | A2 | 7/2001 |
| EP | 0850780 | B1 | 11/2001 |
| EP | 1186707 | A2 | 3/2002 |
| EP | 1197503 | A | 4/2002 |
| EP | 0893273 | B1 | 6/2002 |
| EP | 0877119 | B1 | 12/2002 |
| EP | 1097268 | B1 | 3/2004 |
| EP | 1400367 | A2 | 3/2004 |
| EP | 0944761 | B1 | 12/2004 |
| EP | 1484189 | A3 | 1/2005 |
| EP | 1101624 | B1 | 2/2005 |
| EP | 1251013 | B1 | 4/2006 |
| EP | 1739231 | A1 | 1/2007 |
| GB | 331578 | | 7/1930 |
| GB | 1287919 | A | 9/1972 |
| GB | 1331816 | A | 9/1973 |
| JP | 03113090 | A2 | 5/1991 |
| JP | 6123098 | | 5/1994 |
| JP | 09031891 | A | 2/1997 |

(56) References Cited

FOREIGN PATENT DOCUMENTS

| | | | |
|---|---|---|---|
| JP | 9111694 | | 4/1997 |
| JP | 10168792 | A | 6/1998 |
| JP | 11335998 | | 12/1999 |
| JP | 2005125522 | A | 5/2004 |
| JP | 2004249642 | A | 9/2004 |
| JP | 2006001028 | A | 1/2006 |
| WO | WO9012920 | A1 | 11/1990 |
| WO | WO9510659 | A1 | 4/1995 |
| WO | WO9534715 | A1 | 12/1995 |
| WO | WO96/29199 | A | 9/1996 |
| WO | WO9737842 | A1 | 10/1997 |
| WO | WO9744524 | A1 | 11/1997 |
| WO | WO9928551 | A1 | 6/1999 |
| WO | WO0003086 | A1 | 1/2000 |
| WO | WO0017446 | A1 | 3/2000 |
| WO | WO0129316 | A1 | 4/2001 |
| WO | WO0155504 | A1 | 8/2001 |
| WO | WO0198585 | A1 | 12/2001 |
| WO | WO03004768 | A1 | 1/2003 |
| WO | WO03064764 | A1 | 8/2003 |
| WO | WO03100167 | A1 | 12/2003 |
| WO | WO2004048686 | A1 | 6/2004 |
| WO | WO2004048687 | A1 | 6/2004 |
| WO | WO2004048688 | A1 | 6/2004 |
| WO | WO2004048689 | A1 | 6/2004 |
| WO | WO2004048692 | A2 | 6/2004 |
| WO | WO2004111335 | A1 | 12/2004 |
| WO | WO2005021867 | A2 | 3/2005 |
| WO | WO2005031064 | A1 | 4/2005 |
| WO | WO2005042837 | A1 | 5/2005 |
| WO | WO2005088009 | A1 | 9/2005 |

OTHER PUBLICATIONS

D.I. Orloff, T.F. Patterson, P.M. Parviainen, "Opening the Operating Window of Impulse-Drying—Part II. Pressure Differential as a Source of Delamination," Tappi Journal 81(8): p. 194-203, 1998.

D.I. Orloff, T.F. Patterson, P.M. Phelan, I. Rudman, "Opening the Operating Window of Impulse Drying—Part III. Controlled Decompression Experiments," Tappi Journal 81 (9): p. 159-162,1998.

A. Lundh, C. Fellers, "The Z-toughness Method for Measuring the Delamination Resistance of Paper," Nordic Pulp and Paper Research Journal, 16(4) p. 298-305, 2001.

G.M. Glenn, W.J. Orts, "Properties of starch-based foam formed by compression/ explosion processing," Industrial Crops and Products 13(2), p. 135-143, 2001.

I. Rudman, D.I. Orloff, "Dynamic Thickness and Temperature Measurements During Wet Pressing and Impulse Drying," Tappi Journal, 1(5), p. 8-12, 2002.

J.R. Street, A.L. Fricke, L.P. Reiss, "Dynamics of Phase Growth in Viscous, Non-Newtonian Melts," Ind. Eng. Chem. Fund., 10, p. 54-64, 1971.

W. Yang and H. Yeh, "Theoretical Study of Bubble Dynamics in Purely Viscous Fluids," AIChE Journal, 12, p. 927-931, 1966.

F. Bloom, Bubble Stability in a Class of non-Newtonian Fluids with Shear Dependent Viscosities, Int. J. of Nonlinear Mechanics, 37, p. 527-539, 2002.

H.G. Schwartzberg, J.P.C. Wu, A. Nussinovitch, J. Mugerwa, "Modelling Deformation and Flow During Vapor-Induced Puffing," Journal of Food Engineering, 25, p. 329-372, 1995.

International Search Report for PCT/US2008/009649, mailed Jan. 22, 2009.

International Search Report for PCT/US2007/019917, mailed Feb. 19, 2008.

International Search Report for PCT/US07/04742, mailed Oct. 1, 2007.

Supplemental European Search Report for EP07751498, published Sep. 14, 2009.

J.J. Clancy et al., "Introduction to bubble coatings," Oct. 1, 1965, TAPPI. [cited in EP Supplemental Srch Rpt. Text not submitted].

Office Action for U.S. Appl. No. 12/156,049, Sep. 1, 2010.

Office Action for U.S. Appl. No. 12/156,050, Feb. 25, 2009.

Office Action for U.S. Appl. No. 12/156,050, Nov. 30, 2009.

Office Action for U.S. Appl. No. 12/156,050, Jun. 1, 2010.

Office Action: Restriction Requirement for U.S. Appl. No. 12/156,049, Sep. 1, 2010.

Office Action for U.S. Appl. No. 12/156,049, Dec. 6, 2010.

Office Action: Advisory Action for U.S. Appl. No. 12/156,050, Feb. 19, 2010.

Office Action for U.S. Appl. No. 12/156,050, Nov. 12, 2010.

Office Action: Notice of Allowance for U.S. Appl. No. 12/156,049, Nov. 27, 2012.

Office Action for U.S. Appl. No. 12/156,050, Dec. 7, 2012.

Office Action: Advisory Action for U.S. Appl. No. 12/156,050, Jan. 24, 2013.

Office Action: Advisory Action for U.S. Appl. No. 12/156,049, Aug. 2, 2011.

Office Action for U.S. Appl. No. 12/156,049, Nov. 18, 2011.

Office Action for U.S. Appl. No. 12/156,049, May 14, 2012.

Shuichi Maeda, "Preparation of Bubble Coating and Formation of Microporous Layer," Journal of the Japan Society of Colour Material 2001. Downloaded from http://sciencelinks.jp/j-east/article/200111/000020011101A0411039.php.

Office Action: Advisory Action for U.S. Appl. No. 12/156,050, Jan. 28, 2011.

Office Action for U.S. Appl. No. 12/156,049, Apr. 26, 2011.

Office Action for U.S. Appl. No. 12/156,050, Jun. 27, 2012.

Shuichi Maeda, "Preparation of Bubble Coating and Formation of Microporous Layer," Journal of the Japan Society of Colour Material (2001). Downloaded from http://sciencelinksjp/j-east/article/200111/000020011101A0411039.php.

Office Action: Advisory Action for U.S. Appl. No. 12/156,055, Jan. 28, 2011.

* cited by examiner

METHOD FOR TREATING A SUBSTRATE

REFERENCE TO RELATED APPLICATION

This patent application is a continuation of and claims priority of copending International Patent Application Number PCT/US07/19917 filed Sep. 13, 2007 which claims priority of U.S. Provisional Application Ser. No. 60/957,478 filed on Aug. 23, 2007 and which is a Continuation-in-Part of copending International Patent Application Number PCT/US07/04742 filed on Feb. 22, 2007 which claims priority from U.S. Provisional Application Ser. No. 60/776,114 filed on Feb. 23, 2006. All of the listed applications are hereby incorporated by reference in their entireties.

BACKGROUND OF THE INVENTION

The present disclosure relates to a method for treating a substrate with a polymer film-forming composition. More particularly, the disclosure relates to a paper or paperboard manufacturing method comprising the steps of applying a polymer film-forming coating to a substrate, and, bringing the polymer coating into contact with a heated surface while the polymer coating is still in a wet state. The resulting polymer layer has a smooth surface with voids (e.g., bubbles) just below the surface. In certain embodiments, the polymer coating may comprise a crosslinkable hydrogel, and a crosslinking solution may be applied to the polymer coating on the substrate surface thereby forming at least a partially crosslinked polymer coating then placed into contact with a heated surface. The present disclosure also relates to a treated substrate product. The present disclosure also relates to a method for treating a substrate with a polymer film-forming composition, and bringing the substrate into contact with a heated surface in a pressure nip.

Paper is manufactured by an essentially continuous production process wherein a dilute aqueous slurry of cellulosic fiber flows into the wet end of a paper machine and a consolidated dried web of indefinite length emerges continuously from the paper machine dry end. The wet end of the paper machine comprises one or more headboxes, a drainage section and a press section. The dry end of a modern paper machine comprises a multiplicity of steam heated, rotating shell cylinders distributed along a serpentine web traveling route under a heat confining hood structure. Although there are numerous design variations for each of these paper machine sections, the commercially most important of the variants is the fourdrinier machine wherein the headbox discharges a wide jet of the slurry onto a moving screen of extremely fine mesh.

The screen is constructed and driven as an endless belt carried over a plurality of support rolls or foils. A pressure differential across the screen from the side in contact with the slurry to the opposite side draws water from the slurry through the screen while that section of the screen travels along a table portion of the screen route circuit. As slurry dilution water is extracted, the fibrous constituency of the slurry accumulates on the screen surface as a wet but substantially consolidated mat. Upon arrival at the end of the screen circuit table length, the mat has accumulated sufficient mass and tensile strength to carry a short physical gap between the screen and the first press roll. This first press roll carries the mat into a first press nip wherein the major volume of water remaining in the mat is removed by roll nip squeezing. One or more additional press nips may follow.

From the press section, the mat continuum, now generally characterized as a web, enters the dryer section of the paper machine to have the remaining water removed thermodynamically.

Generally speaking, the most important fibers for the manufacture of paper are obtained from softwood and hardwood tree species. However, fibers obtained from straw or bagasse have been utilized in certain cases. Both chemical and mechanical defiberizing processes, well known to the prior art, are used to separate papermaking fiber from the composition of natural growth. Papermaking fiber obtained by chemical defiberizing processes and methods is generally called chemical pulp whereas papermaking fiber derived from mechanical defiberizing methods may be called groundwood pulp or mechanical pulp. There also are combined defiberizing processes such as semichemical, thermochemical or thermomechanical. Any of the tree species may be defiberized by either chemical or mechanical methods. However, some species and defiberizing processes are better economic or functional matches than others.

An important difference between chemical and mechanical pulp is that mechanical pulp may be passed directly from the defiberizing stage to the paper machine. Chemical pulp on the other hand must be mechanically defiberized, washed and screened, at a minimum, after chemical digestion. Usually, chemical pulp is also mechanically refined after screening and prior to the paper machine. Additionally, the average fiber length of mechanical pulp is, as a rule, shorter than that of chemical pulp. However, fiber length is also highly dependent upon the wood species from which the fiber originates. Softwood fiber is generally about three times longer than hardwood fiber.

The ultimate properties of a particular paper are determined in large part by the species of raw material used and the manner in which the paper machine and web forming process treat these raw materials. Important operative factors in the mechanism of forming the paper web are the headbox and screen.

Coated paper or paperboard used for printing and for packaging is generally required to have high level of gloss, excellent smoothness, and excellent printability, as well as certain strength and stiffness characteristics.

If the coated paper or paperboard has a high stiffness, it can pass smoothly through high-speed printing or packaging machines with less feeding jams. Higher stiffness paper can be advantageously used in books, magazines, and catalogues, because it provides a feel of hardness or heaviness similar to a hardcover book. For packaging, high stiffness is necessary for maintaining the structural integrity of the paperboard product during filling and in subsequent use.

Stiffness has close relationship to the basis weight and density of paper. There is a general trend that stiffness increases as the basis weight increases (for a given caliper), and decreases as the paper density increases (for a given basis weight). Stiffness and other properties can be improved by increasing basis weight. However, this would result in a product utilizing more fibers, which add cost and weight. Therefore, coated paper or paperboard with high stiffness but moderate basis weight is desirable. Paper with moderate basis weight is also more economical because less raw material (fiber) is utilized. In addition, shipping costs based on weight are less for low basis weight paper.

In addition to high stiffness, coated paper or paperboard which must be printed is often required to have high gloss and smoothness. For coated paper or paperboard to have such quality characteristics, density typically must be increased to some extent to allow for a usable printing surface. Smoothness is normally achieved by calendering. However, calendering will cause a reduction in caliper, which typically results in a corresponding reduction in stiffness. The calendering process deteriorates the stiffness of paper by significantly reducing caliper and increasing the density. The base sheet for conventional coated board grades typically is heavily densified by calendering to provide a surface roughness low enough to produce final coated smoothness acceptable to the industry. These calendering processes, including wet stack treatment, may increase density by as much as 20% to 25%.

Thus, the relationship between gloss and stiffness and between smoothness and stiffness are generally inversely proportional to each other, for a given amount of fiber per unit area. Packaging grades are sold based on caliper, so manufacturing processes that reduce the caliper (increasing the density of the board) decrease the selling price. Processes that cause less caliper reduction save material costs. Caliper is measured in "points", where a point=0.001 inches. For example, the conventional method for making a 10-point board requires the use of a board having a thickness of greater than 12 points prior to calendering. It would be desirable to be able to produce a finished board having approximately the same thickness as the starting substrate.

Improvements in the calendering process including moisture gradient calendering, hot calendering, soft calendering, and belt calendering slightly improved stiffness for a given caliper but did not change the fundamental ratio between caliper, stiffness, smoothness, and printing properties.

Various proposals have been made to improve the stiffness of coated paper or paperboard without calendering for printing. For example, several proposals include high softwood content in the raw stock, addition of specially engineered fibers in the raw stock, addition of highly branched polymers within the raw stock, and high amounts of starch or copolymer latex with a high glass transition temperature (commonly referred to as "Tg") within the coating formulation.

However, potential drawbacks to these methods of stiffness improvement are that although they are useful in improving paper stiffness, they could potentially degrade the smoothness, gloss, and/or printability of the coated paper obtained.

For the reasons mentioned above, it has been very difficult to obtain satisfactory paper smoothness without increasing density. Other methods can be used for changing the density/smoothness relationship in paper and paperboard grades. Applying a paper coating is a very common way to enhance the surface properties of paper without causing the drastic increases in paper density typically associated with the levels of calendering required to obtain a certain level of smoothness. Preferably, the final coated surface should be uniform to provide acceptable appearance and printing properties.

Therefore, it would be desirable to provide a paper or paperboard product having the desired properties while maintaining the initial density of the sheet or minimizing the increase in density. Furthermore, it would be desirable to provide a paper or paperboard exhibiting improved smoothness without the concomitant increase in density associated with conventional methods for creating smoothness. Cast coating methods exist for producing a very smooth surface, but these methods are typically run at production rates slower than the speed of many paper machines.

SUMMARY OF THE DISCLOSURE

In one embodiment, a product is disclosed that includes a substrate with a coating on the substrate. The coating includes a water soluble polymer and a release agent. There are voids formed within the coating.

In another embodiment, a product is disclosed that includes a substrate with a coating on the substrate. The coating includes a water soluble polymer and essentially no elastomeric material. There are voids formed within the coating.

In another embodiment, a product is disclosed that includes a substrate with a coating on the substrate. The coating includes a surface, and the surface has a Sheffield Smoothness of less than about 300 units. There are voids formed under the surface of the coating.

In another embodiment, a product is disclosed that includes a substrate with a coating on the substrate. The coating includes a water soluble polymer, a release agent, and essentially no elastomeric material. The coating includes a surface, and the surface has a Sheffield Smoothness of less than about 300 units. There are voids formed under the surface of the coating.

In another embodiment, a process is disclosed for treating a substrate. A wet film of aqueous polymer solution is applied to the substrate. The aqueous polymer solution is immobilized by bringing it into contact with a heated surface to cause the aqueous polymer solution to boil, and to at least partially dry the aqueous polymer solution.

In another embodiment, a process is disclosed for treating a substrate. A wet film of aqueous polymer solution is applied to the substrate. The aqueous polymer solution is immobilized by bringing it into contact with a heated surface to cause the aqueous polymer solution to boil and form voids that remain in the aqueous polymer solution, and to at least partially dry the aqueous polymer solution.

In another embodiment, a process is disclosed for treating a substrate. A coating of aqueous polymer solution is applied to the substrate as a wet film. The coating includes a water soluble polymer and a release agent. The film is immobilized by bringing it into contact for less than about 3 seconds with a heated surface with a temperature above about 150° C. so as to cause the aqueous polymer solution to boil and form voids in the film, and to at least partially dry the film.

In another embodiment, a process is disclosed for treating a substrate. A coating of aqueous polymer solution is applied to the substrate as a wet film. The coating includes a water soluble polymer and essentially no elastomeric material. The film is immobilized by bringing it into contact for less than about 3 seconds with a heated surface with a temperature above about 150° C. so as to cause the aqueous polymer solution to boil and form voids in the film, and to at least partially dry the film.

In another embodiment, a process is disclosed for treating a substrate. A coating of aqueous polymer solution is applied to the substrate as a wet film. The coating includes a water soluble polymer and essentially no elastomeric material. The film is immobilized by bringing it into contact for less than about 3 seconds with a heated surface with a temperature above about 150° C. so as to cause the aqueous polymer solution to boil and form voids in the film, and to at least partially dry the film. The coating surface after drying has a Sheffield Smoothness of less than about 300 units.

In another embodiment, a process is disclosed for treating a substrate. A coating of aqueous polymer solution is applied to the substrate as a wet film. The coating includes a water soluble polymer, a release agent, and essentially no elastomeric material. The film is immobilized by bringing it into contact for less than about 3 seconds with a heated surface with a temperature above about 150° C. so as to cause the aqueous polymer solution to boil and form voids in the film, and to at least partially dry the film. The coating surface after drying has a Sheffield Smoothness of less than about 300 units.

In another embodiment, a process is disclosed for treating a cellulosic substrate. A wet film of aqueous polymer solution is applied to the substrate. The aqueous polymer solution includes at least about 60% water soluble polymer by dry weight, and up to 10% release agent by dry weight. The aqueous polymer solution is immobilized by bringing it into contact for less than about 3 seconds with a heated surface with a temperature above about 150° C. so as to cause the aqueous polymer solution to boil and form voids in the aqueous polymer solution, and to at least partially dry the aqueous polymer solution.

In another embodiment, a process is disclosed that includes applying a coating film to a substrate, bringing the film into contact with a heated surface in a nip, the nip local pressure initially increasing and the film being heated with no vapor formation, the nip local pressure then decreasing and the coating film boiling and forms voids in the film, the film being at least partly dried.

In another embodiment, a process is disclosed that includes applying a coating film to a substrate, the coating including a water soluble polymer and a release agent, bringing the film into contact with a heated surface in a nip, the nip local pressure initially increasing and the film being heated with no vapor formation, the nip local pressure then decreasing and the coating film boiling and forms voids in the film, the film being at least partly dried.

In another embodiment, a process is disclosed that includes applying a coating film to a substrate, bringing the film into nipped contact for less than about 3 seconds with a heated surface having a temperature above about 150° C., the nip local pressure initially increasing and the film being heated with no vapor formation, the nip local pressure then decreasing and the coating film boiling and forms voids in the film, the film being at least partly dried.

In another embodiment, an apparatus is disclosed for treating a web substrate, comprising a coating applicator, a drum having a diameter between about 24-84 inches, a press roll forming a nip with the drum having a nip dwell time between about 1-60 milliseconds, the web substrate travels through the nip at between about 300-3000 fpm, and an energy source for maintaining the drum temperature above the boiling point of the coating.

In another embodiment, an apparatus is disclosed for treating a web substrate, comprising a coating applicator, a drum having a diameter between about 24-84 inches, a belted shoe device forming a nip with the drum having a nip dwell time between about 1-225 milliseconds, the web substrate travels through the nip at between about 300-3000 fpm, and an energy source for maintaining the drum temperature above the boiling point of the coating.

In another embodiment, a process is disclosed that includes applying a coating film to a substrate, heating the film under a pressure with no vapor formation, and reducing the pressure so that the film boils and forms voids that remain in the film.

In another embodiment, a process is disclosed that includes applying a coating film to a substrate, wherein the coating includes a water soluble polymer and a release agent, heating the film under a pressure with no vapor formation, and reducing the pressure so that the film boils and forms voids that remain in the film.

In another embodiment, a process is disclosed that includes applying a coating film to a substrate, bringing the film into contact for less than about 3 seconds with a heated surface having a temperature above about 150° C., wherein the contact comprises a nipped contact with the heated surface, heating the film under a pressure with no vapor formation, and reducing the pressure so that the film boils and forms voids that remain in the film.

DETAILED DESCRIPTION OF THE INVENTION

Figure 1:
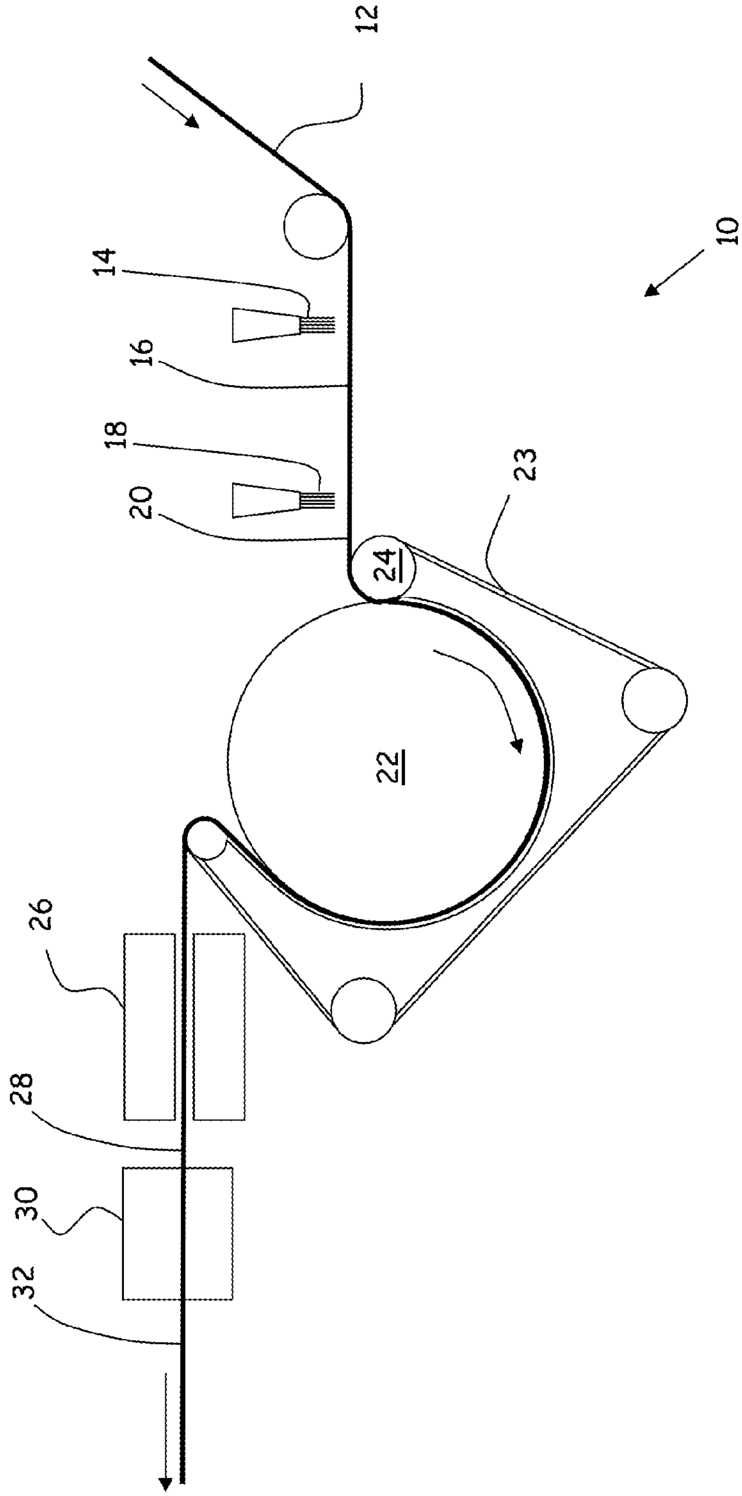
FIG. 1 is a schematic view of an apparatus for treating a substrate with a polymer coating in accordance with one embodiment of the present invention.

In describing the preferred embodiments, certain terminology will be utilized for the sake of clarity. It is intended that such terminology include not only the recited embodiments but all technical equivalents that operate in a similar manner, for a similar purpose, to achieve a similar result. The citation of any document is not to be construed as an admission that it is prior art with respect to the present invention. Unless indicated otherwise or unless the context suggests otherwise, all weights, percentages, and ratios are by weight.

The present disclosure relates to a method for treating a substrate with a polymer film-forming coating. More particularly, the disclosure relates to a paper or paperboard manufacturing method comprising the steps of applying a polymer coating to a substrate, and bringing the polymer coating into contact with a heated surface while the polymer coating is still in a wet state. Boiling of water in the polymer coating causes voids to form under the surface, but the surface of the film is smooth due to intimate contact with the heated surface. The paper or paperboard produced in accordance with certain embodiments of the present invention exhibits desirable levels of surface flatness and smoothness without significant densification of the base paper. In certain embodiments, the polymer coating may include a crosslinkable material and a crosslinking solution may be applied to the polymer coating on the substrate surface thereby forming at least a partially crosslinked polymer film-forming composition. In such cases, the polymer coating may typically be applied to the web first and then the cross linking solution applied before the treated web contacts the heated surface. For weakly cross linking polymers, it may be possible to provide the cross linking solution in the coating itself.

One advantage of treating a substrate with a polymer film-forming coating in accordance with the present invention relates to the improvement in smoothness and/or flatness that can be obtained without significantly increasing the density or decreasing the caliper of the sheet. The heavy calendering of the cellulose paper web associated with conventional techniques is not required to produce a paper having print properties comparable to conventional coated papers. Furthermore, even when the cellulose paper web is smoothed, much lower pressures can be applied to provide similar printing properties on papers with increased stiffness. In accordance with certain embodiments of the present invention, the cellulose paper web is smoothed such that the caliper decreases not more than about 7% and typically is decreased by between about 2% and 5%. Depending on the properties of the substrate, the caliper decrease may be less. If the web has been heavily precalendered the caliper decrease may be between 0 and 5% By comparison, conventional coated papers and paperboards are typically calendered before coating at much higher pressures, which cause an increase in density of from about 20 to 25%. In accordance with one aspect of the invention, the cellulose paper web may be calendered to a Parker Print Surf smoothness of between about 2 and 6 microns prior to application of the polymer film. However, substrates with higher Parker Print Surf values may be used. For example, a substrate with a Parker Print Surf smoothness of about 9 microns may be used. Parker Print Surf smoothness is determined in accordance with TAPPI standard T 555 om-99.

FIG. 1 illustrates an apparatus 10 useful in practicing certain embodiments of the invention. A substrate 12 is subjected to treatment on one surface thereof with crosslinkable polymer coating 14 to form a layer of polymer coating 16 on substrate 12. While the polymer coating is still wet, an optional crosslinking solution 18 may be applied to the layer of polymer coating 16 thereby forming a cross linked polymer coating 20 on substrate 12. The polymer coating 20 is typically at least partially crosslinked. The polymer coating is still in a wet state before being brought into contact with hot polished drum 22 by pressing the web 12 against the drum surface with a press roll 24. Heat from the drum surface causes boiling within the wet polymer coating, so that voids form in the polymer under the surface. The crosslinking solution causes the polymer coating to crosslink and gel into a substantially continuous layer or film. Typically, the resulting film will exhibit improved strength over the base sheet. The polymer treated sheet may not be fully dried so it may be conveyed through a secondary heater 26. Any type of secondary heating device can be used that is capable of drying the treated sheet without adversely affecting the properties of the sheet. The treated sheet emerges from secondary heaters 26 as a polymer film treated substrate 28 characterized by improved flatness and smoothness. Optionally, additional coating processes 30 (and other processes such as coating, gloss calendering, etc) may be used to form a coated product 32.

As shown in FIG. 1, the web wraps a substantial portion of hot polished drum 22. The amount of wrap may depend on operating conditions such as web speed, moisture content of the polymer film forming composition 20, temperature of the drum, and other process factors. It is possible that a small amount of contact time with hot polished drum 22 may be sufficient. Besides providing the substrate in web form, it may also be provided in sheet form. The crosslinkable polymer coating and the optional crosslinking solution may be applied by any number of techniques, such as dip-coating, rod coating, doctor blade coating, gravure roll coating, reverse roll coating, metered size press, smooth roll coating, extrusion coating, curtain coating, spray coating and the like. The crosslinkable polymer coating and crosslinking solutions may be applied by the same coating technique or different methods may be used for each.

One embodiment in accordance with the present invention is based on the coagulation or gelling that occurs between polyvinyl alcohol and borax. In accordance with this type of system polyvinyl alcohol (PVOH) is an example of a crosslinkable polymer and a borax solution is an example of a corresponding crosslinker. Once the PVOH solution 14 is applied, at approximately 25% solids and coverage of about 5 $g/m^2$ dry, the crosslinker solution 16 is applied at a rate and solution solids to give a borax coverage of at least about 0.1 $g/m^2$ dry. This wet, crosslinked polymer film 20 is then brought into contact with a hot polished drum 22 by pressing the web 12 against the drum surface with a press roll 24. The drum surface temperature is at least about 150° C., or in accordance with certain embodiments, at least about 190° C. so that the coating can be dried and release from the drum surface. The contact time of the polymer film to the drum may be in the range of up to about 3.0 seconds, more particularly between about 0.5-2.0 seconds. This is sufficient time for the polymer film to immobilize and solidify, giving the surface of the polymer film a flat smooth finish mirroring the surface of the drum. Immobilizing the polymer film includes at least partially drying the film. The coating is not necessarily completely dry when it leaves the drum, so additional drying 26 may be needed. The web then continues on through the process and may receive additional coating layers, for example conventional coatings, prior to being wound up. The polymer coating may be applied as a single layer or as two or more layers. Limited experiments also suggest that a polymer film may be immobilized or solidified with just momentary contact with the heated drum, as may be achieved by using a press roll 24 to press the web 12 against the hot drum 22, without any additional wrap of web around the hot drum. However, it is contemplated that some wrap of the hot drum may be practiced, and that optionally a felt 23 may be used to help press the web into contact with the hot drum. If a felt 23 is used to help press the web into contact with the hot drum, then the felt 23 may be carried between the press roll 24 and the heated drum 22.

The contact between the polymer film and the hot drum causes boiling to occur in the polymer film, creating voids or bubbles in the film. Nip conditions should be adjusted so that boiling may occur. Satisfactory lab results were obtained with a resilient press roll, a 9" wide web, and nip loads between about 15 to about 30 pounds per linear inch (PLI). Depending on press roll hardness and the diameters of the hot drum and press roll, conditions may have to be adjusted.

Specific examples of crosslinkable polymers useful in certain embodiments of the present invention include crosslinkable hydrogels. The following crosslinkable hydrogels are particularly useful: starch, waxy maize, protein, polyvinyl alcohol, casein, gelatin, soybean protein, and alginates. One or more polymers selected from the above-recited ones can be used. The crosslinkable polymer typically is applied in solution form and usually as an aqueous solution. The concentration of the polymer in solution is not particularly limited but can be easily determined by one of ordinary skill in the art. For example, a solution of about 20% starch may be used as described below. The crosslinkable polymer may be applied to provide a surface coverage (dry basis) of from about 3 to about 15 gsm ($g/m^2$) more particularly from about 4 to about 8 gsm. In accordance with particular embodiments of the present invention, the crosslinkable polymer may be used in an amount ranging from about 60% to about 100% by weight of the dry materials.

Specific examples of crosslinkers include borates, aldehydes, ammonium salts, calcium compounds and derivatives thereof. The crosslinker if used typically may be applied in solution form and usually as an aqueous solution. The concentration of the crosslinker in solution is not particularly limited but can be easily determined by one of ordinary skill in the art. The crosslinker may be applied to provide a surface coverage (dry basis) of from about 0.1 to about 0.5 gsm more particularly from about 0.2 to about 0.3 gsm.

The temperature of the heated surface is in excess of that typically used for cast coating. The higher temperature should allow for higher run speeds. It is anticipated that paper or paperboard produced in accordance with certain embodiments of the present invention may be produced at speeds in the range of about 750 to 3000 fpm, more particularly from about 1500 to 1800 fpm. Although not wishing to be bound by theory, the higher temperature and the dwell time are selected such that the coating composition is heated and it appears that when the coating boils it remains for a time in contact with the drum. The contact results in a polymer film surface that exhibits improved smoothness and gloss. Furthermore, the treated surface is ink receptive. Boiling of the coating as it is being smoothed on the polished drum surface appears to significantly improve gloss and smoothness of the finished polymer film treated substrate.

The polymer coating on the substrate is typically pressed against the heated surface for a sufficient period of time to allow the coating to boil and then set to a smooth, glossy finish. In accordance with particular embodiments, the contact time of the forming polymer film to the drum is within the range of up to about 3.0 seconds, more particularly up to about 2.0 seconds, and most particularly up to about 0.5 seconds.

The polymer coating may also include one or more pigments. Examples of useful pigments include, but are not limited to, kaolin, talc, calcium carbonate, calcium acetate, titanium dioxide, clay, zinc oxide, alumina, aluminum hydroxide and synthetic silica such as noncrystalline silica, amorphous silica or finely divided silica are examples thereof. Organic pigments may also be used.

The crosslinkable polymer coating and/or the crosslinking solution may further include one or more release agents. Specific examples of release agents useful herein include, without limitation, waxes, such as petroleum, vegetable, animal and synthetic waxes, fatty acid metal soaps, such as metal stearates, long chain alkyl derivatives, such as fatty esters, fatty amides, fatty amines, fatty acids, and fatty alcohols, polymers, such as polyolefins, silicone polymers, fluoropolymers, and natural polymers, fluorinated compounds, such as fluorinated fatty acids and combinations thereof. One of ordinary skill in the art can readily determine the amount of release agent to use in a particular application. Typically, the coating may contain from about 0.3 to 10 percent release agent, more particularly from about 2 to 5 percent by weight. Instead of or in addition to release agent in the coating, release agent may be sprayed onto the coating surface, or applied to the heated drum surface. If a non-sticking surface can be provided on the heated drum, whether by a release agent or other means, then application of a release agent in the coating or onto the coating surface may not be needed.

The polymer coating employed in certain embodiments of the present invention, wherein at least the aforementioned polymer is contained, is generally prepared in the form of an aqueous composition. An appropriate ratio between those ingredients is different depending on the polymer composition, the application conditions and so on, but it has no particular limitation as far as the treated paper produced can satisfy the quality required for the intended use thereof. Further, the polymer coating according to certain embodiments of the present invention can optionally contain additives, such as a dispersant, a water retaining agent, a thickening agent, an anti-foaming agent, a preservative, a colorant, a waterproofing agent, a wetting agent, a drying agent, an initiator, a plasticizer, a fluorescent dye, an ultraviolet absorbent, a release agent, a lubricant and a cationic polyelectrolyte.

In accordance with a particular embodiment of the present invention, the substrate is treated with the polymer coating near a central region of the paper machine, such as the size press position. Furthermore, the apparatus for applying the polymer coating to the substrate may be positioned relative to the paper machine so as to apply the polymer film to either surface of the forming paper web. More than one apparatus may be employed to apply a polymer film to each side of the forming paper web.

These advantages allow the use of lightly calendered paper or paperboard, thus preserving stiffness while providing good printing properties.

The base sheet is typically formed from fibers conventionally used for such purpose and, in accordance with the particular embodiments, includes unbleached or bleached kraft pulp. The pulp may consist of hardwood or softwoods or a combination thereof. The basis weight of the cellulose fiber layer may range from about 30 to about 500 gsm, and more particularly, from about 150 to about 350 gsm. The base sheet may also contain organic and inorganic fillers, sizing agents, retention agents, and other auxiliary agents as is known in the art. The final paper product can contain one or more cellulose-fiber layers, polymer film layers and, in accordance with certain embodiments, other functional layers.

The present invention in accordance with certain embodiments, provides one or two-sided coated paper or paperboard for printing or packaging whose Parker Print Surf smoothness value after the coating and finishing processes, when measured according to TAPPI paper and pulp test method No. 5A, is lower than about 2-3 microns.

The paper or paperboard described herein may further be provided with one or more additional coatings. A top coating containing conventional components may be provided to improve certain properties of the paper or paperboard. Examples of such conventional components include pigments, binders, fillers and other special additives. The top coating, when present, may be applied at much lower coat weights than conventional coatings and yet provide similar print properties. Accordingly, the top coating weight may be about 4 to 9 gsm as a single coating layer or about 8 to 18 gsm as two coating layers. By contrast, conventional coated papers typically require about 10 to 20 gsm as a single coating layer or 18 to 30 gsm as two coating layers to provide comparable surface properties. The paper or paperboard may also be coated on the side of the sheet having the non-treated surface.

Having given the teachings of the present disclosure, it will now be illustrated by means of specific examples which should not be considered as limiting the scope of the claims in any way.

A base sheet having a caliper of about 10 points, a Parker Print Surf (PPS) value of about 9 microns (10 kg pressure with a soft backing) and a Sheffield smoothness of about 310 can be treated in accordance with certain embodiments of the present invention to provide a treated sheet having improved smoothness with only a minimal decrease in caliper. The base sheet may be treated by applying a PVOH solution at approximately 25% solids to the base sheet to provide a coverage of about 5 $g/m^2$ dry. Next, the crosslinker solution may be applied at a rate and solution solids to give a borax coverage of at least about 0.1 $g/m^2$ dry. The wet, crosslinked polymer film can be brought into contact with a hot polished drum by pressing the sheet against the drum surface. The drum surface temperature may be at least about 190° C. The coating would be dried and released from the drum surface. The contact time of the polymer film to the drum would typically be in the range of between about 0.5-2.0 seconds. The treated sheet would have a caliper of between about 9.6 and 10.0 points, a PPS value of about 2.4 to 3.0 and a Sheffield smoothness of about 140-170.

In a preferred embodiment, a starch solution may be used as the polymeric material in the polymer coating.

One aspect of the disclosure relates to a paper or paperboard manufacturing method. In accordance with one embodiment of the invention, the method includes applying a polymer coating comprising a crosslinkable hydrogel to a substrate, applying a crosslinking solution to the polymer coating on the substrate surface thereby forming at least a partially crosslinked polymer film-forming coating and bringing the polymer film-forming coating into contact with a heated surface while the polymer film-forming coating is still in a wet state. The heated surface may be a hot polished drum having a flat smooth finish. The temperature of the heated surface typically is within a range of from about 150° C. to about 240° C. Higher temperatures may be used, for example up to about 300° C. The temperature of the heated surface in accordance with certain embodiments is within a range of from 180° C. to about 200° C., and in accordance with certain embodiments is at least about 190° C.

In accordance with particular embodiments of the invention, the crosslinkable polymer may be selected from the group consisting of starch, waxy maize, protein, polyvinyl alcohol, casein, gelatin, soybean protein, and alginates. In accordance with certain aspects of the present invention, the crosslinkable polymer may be used in amounts ranging from about 60 to about 100% by weight of the dry materials.

In some manifestations, the crosslinker may be a borate or borate derivative such as borax, sodium tetraborate, boric acid, phenyl boronic acid, or butyl boronic acid. The crosslinker may be used in amounts ranging from about 1 to about 12% based on the crosslinkable polymer.

The present invention is also directed to treated papers produced in accordance with the method described herein. The treated papers are characterized by improved smoothness in conjunction with relatively minor increases in density compared to the original sheet.

As it is desirable to have the coating in a wet state when it contacts the heated drum, the coating may be moistened for example by applying water. One method is to spray water onto the coating before it contacts the hot drum. However, in certain embodiments, it may also be possible to operate without any additional moistening.

In certain embodiments, starch may be used as the soluble polymer. In certain embodiments, starch-based coatings can be run successfully without a crosslinker, and good results may be obtained without gelling (also called coagulating).

A starch solution containing 2-5% of a release agent was brought into contact with a heated drum under conditions described above. In certain conditions, if moistening of the coating is desired, water alone may be used as the spray and yield a good reproduction of the polished surface. If the coating solids are low enough, the process works without a moistening water spray. A 20% solids starch coating was applied to the web and brought into contact with a heated drum, and gave good reproduction.

Starch coatings were also tested having 25% and 30% solids. Both of these coatings released from the drum without any sticking, but without good surface reproduction. The 25% solids coating gave moderate reproduction, but the 30% solids coating was not very smooth. It appears that a certain amount of water present at the surface may help to propagate boiling throughout the entire coating. Below a certain amount of surface water, localized surface areas may still have sufficient boiling to give good reproduction of the drum surface, but other surface areas do not. Thus, without moistening of the surface with a water spray, as solids increase above 20%, the percentage of the area that reproduces the smooth drum surface decreases with increasing coating solids, until at about 30% coating solids, little or no surface smoothness reproduction is achieved. If sufficient water is sprayed on the surface of the 30% solids coating before it contacts the heated drum, complete surface reproduction can be obtained. We would expect this relationship to also be affected by rawstock absorptivity, coat weight, coating viscosity and process speed. It should be possible to establish the effects of these parameters by further experiments.

The examples described above were run with a chrome surface on the heated drum. The examples described below were run after the drum was resurfaced with a tungsten carbide coating. In each of these examples, several "runs" were made to collect the data. A run consists of the drum being heated to approximately 190° C., the spray level being set, coating being applied to the web by a metered rod method, optionally followed by moistening spray (which optionally may contain a cross linking agent), and then by the web being brought into contact with the drum at 35 fpm. The drum temperature during a run varied between 180° C. and 190° C. During a run, the only variable that was changed was the coating weight applied by the metering rod. Changes in coating type, coating solids, or spray level were made in different experimental runs on the equipment. Coat weight was measured by differential weight and is reported as bone-dry. Some of experiments were run with cross linker in the coating itself, for example when a material such as starch was used, which does not strongly cross link.

EXAMPLE 1

A minimally pressed base sheet with a basis weight of 111 lb/3000 $ft^2$ was used as a substrate on which to apply and treat simple coating compositions. The first coating was 95% by dry weight CELVOL 203S polyvinyl alcohol (PVOH) and 5% Emtal 50 VCS, a triglyceride used as a release agent (CELVOL is made by Celanese). The coating solids were 20% by weight. The coating was applied by a metering rod. Table 1 is a list of samples and test conditions. Sample 1.1 was made by spraying the coating with a crosslinking solution containing 3% by weight borax and 1% by weight of a sulfonated castor oil as a release agent. The spraying rate was 48 milliliters per minute. The sample replicated the drum well and released from the drum without sticking. Significant improvements in smoothness were obtained with minimal loss of caliper. For sample 1.2, the conditions were the same except that no borax was used in the spray solution. Without the borax to crosslink the polyvinyl alcohol, the coating did not release from the surface, and part of the film remained on the drum surface. This experiment clearly showed the benefit of crosslinking the polyvinyl alcohol.

TABLE 1

| Samples and Test Conditions | | | | | | |
|---|---|---|---|---|---|---|
| Sample | Coating Material | Coating Solids | Moistening Spray | Spray Rate | Replication | Release from Drum |
| 1.1 | 95 w % PVOH, 5% triglyceride | 20 w % | 1 w % castor oil, 3 w % borax | 48 ml/min | Good | Yes |
| 1.2 | 95 w % PVOH, 5% triglyceride | 20 w % | 1 w % castor oil | 48 ml/min | N/A | No |
| 1.3-1.4 | 95 w % CMC, 5% triglyceride | 7 w % | 1 w % castor oil, 3 w % borax | 48 ml/min | not as good as PVOH (1.1) | Yes |
| 1.5 | 95 w % CMC, 5% triglyceride | 7 w % | 1 w % castor oil | 48 ml/min | better than with borax (1.3, 1.4) | Yes |
| 2.1 | 95 w % starch 5% triglyceride | 20 w % | 1 w % castor oil, 3 w % borax | 46 ml/min | good | Yes |
| 2.2-2.5 | 95 w % starch 5% triglyceride | 20 w % | 1 w % castor oil | 46 ml/min | good | Yes |
| 2.6-2.7 | 95 w % starch 5% triglyceride | 20 w % | no spray | 0 | not quite as good as with spray (2.2-2.5) | Yes |
| 3.1-3.2 | 95 w % starch 5% triglyceride | 23 w % | no spray | 0 | good | Yes |
| 3.3-3.4 | 95 w % starch 5% triglyceride | 25.7 w % | no spray | 0 | 90-95% | Yes |
| 3.5-3.6 | 95 w % starch 5% triglyceride | 25.7 w % | 1 w % castor oil | 48 ml/min | 100% | Yes |
| 3.7 | 95 w % starch 5% triglyceride | 30 w % | no spray | 0 | poor | Yes |
| 3.8 | 95 w % starch 5% triglyceride | 30 w % | 1 w % castor oil | 48 ml/min | mottled | Yes |
| 3.9-3.12 | 95 w % starch 5% triglyceride | 30 w % | 1 w % castor oil | 98 ml/min | 100% | Yes |
| 3.13-3.14 | 95 w % starch 5% triglyceride | 17.5 w % | no spray | 0 | 100% | Yes |
| 3.15 | 95 w % starch 5% triglyceride | 10 w % | no spray | 0 | poor | |

In another run, carboxymethyl cellulose (CMC) was substituted for the polyvinyl alcohol to compare polymer performance. The carboxymethyl cellulose was FINNFIX 30 (made by Noviant, a division of Huber), which could only be run at 7% solids due to coating viscosity. The coating was formulated with 95% polymer and 5% Emtal. Samples 1.3 and 1.4 are two different coat weights sprayed with 48 ml/min of borax spray. The coating replicated the drum surface well and released completely from the drum. Smoothness was improved with minimal loss of caliper, but smoothness was not as good as for polyvinyl alcohol. For the run that produced Sample 1.5, no borax was used in the spray. The coating replicated the drum surface well and released completely from the drum. Smoothness was improved by removing the borax. This showed that a non-crosslinked coating could replicate and release from the drum, which indicates that materials other than crosslinkable materials can be used in this process.

EXAMPLE 2

A minimally pressed base sheet having a basis weight of 111 lb/3000 $ft^2$ was used as a substrate on which to apply and treat simple coating compositions. The first coating was 95% by dry weight CLEER-COTE 625 starch (a viscosity modified waxy corn starch, made by A.E. Staley, a division of Tate & Lyle) and 5% Emtal 50 VCS, a triglyceride used as a release agent. The coating solids were 20% by weight. The coating was applied by a metering rod. Sample 2.1 was made by spraying the coating with a crosslinking solution containing 3% by weight borax and 1% by weight of a sulfonated castor oil as a release agent. The spraying rate was 46 milliliters per minute. The sample replicated the drum well and released from the drum without sticking. Significant improvements in smoothness were obtained with minimal loss of caliper. Samples 2.2, 2.3, 2.4 and 2.5 were made with different coat weights of the same coating, but the spray did not contain borax. All samples replicated the surface well and released completely from the drum. Samples 2.6 and 2.7 were run without any spray at all. The samples replicated the surface well and completely released. Smoothness values were not quite as good, but samples still had significantly improved smoothness with minimal reduction in caliper. This demonstrates that the process can work without any moistening spray.

EXAMPLE 3

This experiment was a continuation of Example 2 exploring the effect of coating solids. Samples 3.1 and 3.2 were run at 23% coating solids without any moistening spray. Good replication and release were obtained. For samples 3.3 and 3.4, coating solids were increased to 25.7%, again applied with no moistening spray. Complete release was obtained, but incomplete replication of the surface was achieved. Based on visual inspection, only about 90-95% of the surface replicated the drum. For samples 3.5 and 3.6, this same 25.7% solids coating was run and a moistening spray of 48 ml/min was applied. The surface replication was complete and the smoothness values were greatly improved. For Samples 3.7 through 3.12, a 30% solids coating was used. When no moistening spray was used (3.7), complete release was achieved, but only a small percentage of the surface was replicated. When 48 ml/min of moistening spray was used (3.8), the replication was greatly improved, but the surface was still mottled with areas of poor replication. When the moistening spray was increased to 98 ml/min (3.9, 3.10, 3.11 & 3.12), the replication was complete and smoothness was greatly improved with minimal reduction in caliper. Next, the coating solids were lowered. At 17.5% coating solids (3.13, 3.14) with no moistening spray applied, good release and complete replication were obtained. At 10% solids (3.15) with no moistening spray applied, the low coating viscosity led to reduced coat weight and increased coating absorption into the sheet, so poor replication occurred.

Samples of the smooth products, produced using starch as the polymer coating, at 20% solids, were top coated with a conventional pigmented clay coating (about two-thirds clay and one third carbonate, with a latex binder, applied in a single coat of approximately 10 lb/3000 $ft^2$) applied over the smooth polymer layer. These samples then were cross sectioned to examine the morphology of the coating layer. Cross sectioning was done by freezing the samples in liquid nitrogen, then cracking the samples in two (freeze fracturing). The cracked edges of the samples (e.g., the cross sections) were then viewed under a microscope.

Figure 2:
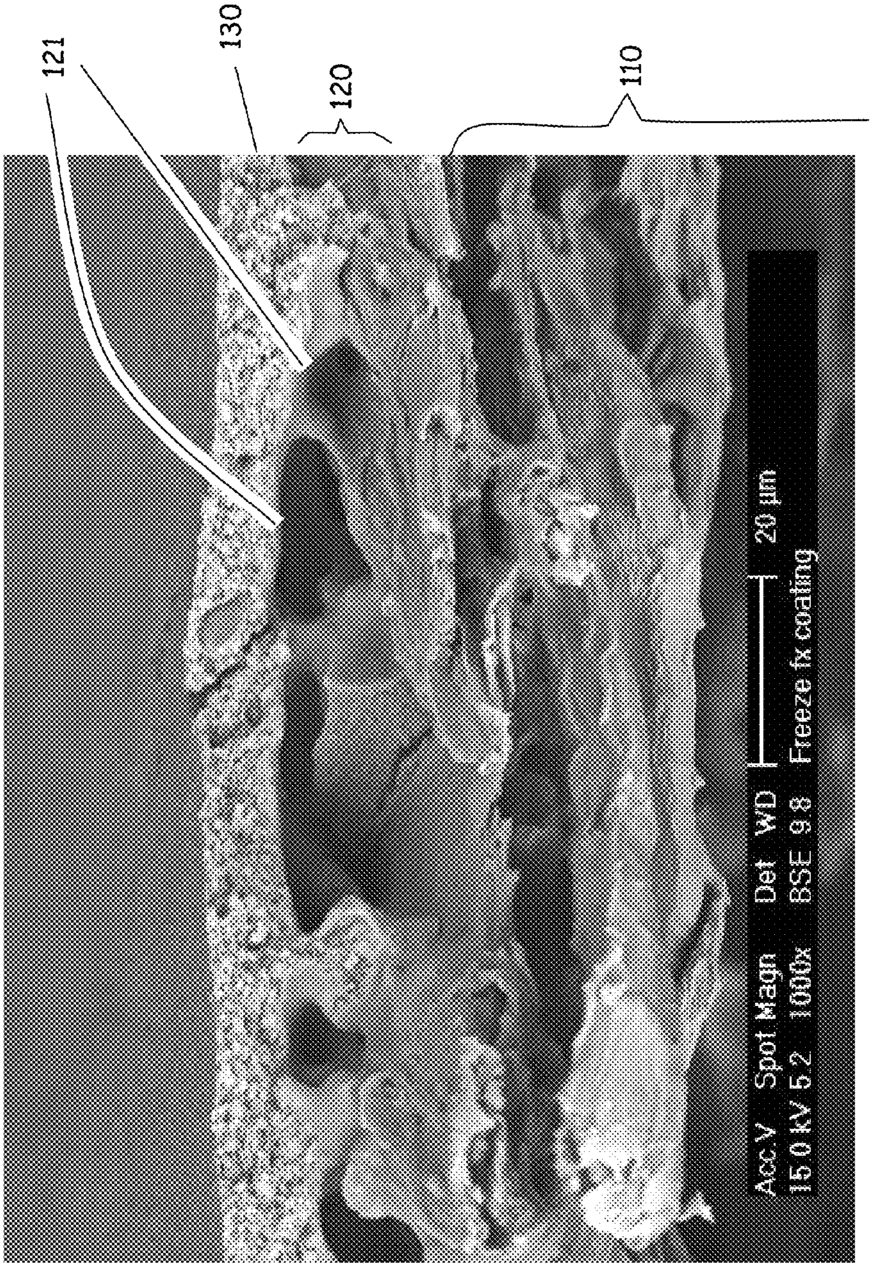
FIGS. 2-9 are cross section micrographs showing the morphology of samples made in accordance with one embodiment of the invention, and having a top coating.

Micrographs revealed that voids exist in the polymer coating layer, as shown in FIGS. 2 through 9, which include measurement bars to indicate their scale. For FIGS. 2-5, the microscope magnification was 1000, and the measurement bars are 20 microns long. In FIG. 2 as an example, the structure as shown includes a paperboard substrate 110. The substrate thickness generally extends below the area of the micrograph. Because of the freeze fracturing process, the substrate 110 as shown in the micrographs is sometimes separated or partly separated from polymer layer 120. Therefore the upper boundary of substrate 110 may be only approximately shown by the bracketed distance denoting the substrate.

In these samples, the polymer coating layer 120 had been applied onto substrate 110, and dried against a heated drum, as described previously. Then a top coating 130 was applied and dried. The term "polymer coating" is used here to describe that layer applied as described above, then contacted while wet against a heated drum. The term "top coating" is used to describe the outer layer, which was applied as one layer. Obviously the "top coating" could be applied in more than layer and could be of coating materials other than those used here. Voids 121 are evident in the polymer coating layer 120, as seen in FIGS. 2-9. FIG. 2 for example shows several voids 121 in polymer coating layer 120, with the voids appearing to be approximately 5 to 20 microns in lateral dimension. It is assumed that their size going "into" the fractured sample is in approximately the same range. The voids typically appear to be somewhat "flattened" in the "vertical" direction, that is, going into the sample thickness. The voids also appear to have "walls" that are relatively smooth, and generally thin. These thin walls are most apparent as seen between adjacent voids. Where a void wall is adjacent to the top coating 130, its thickness may be difficult to see but its presence may be deduced by the smooth lower contour of the top coating 130 adjacent to the void.

Figure 3:
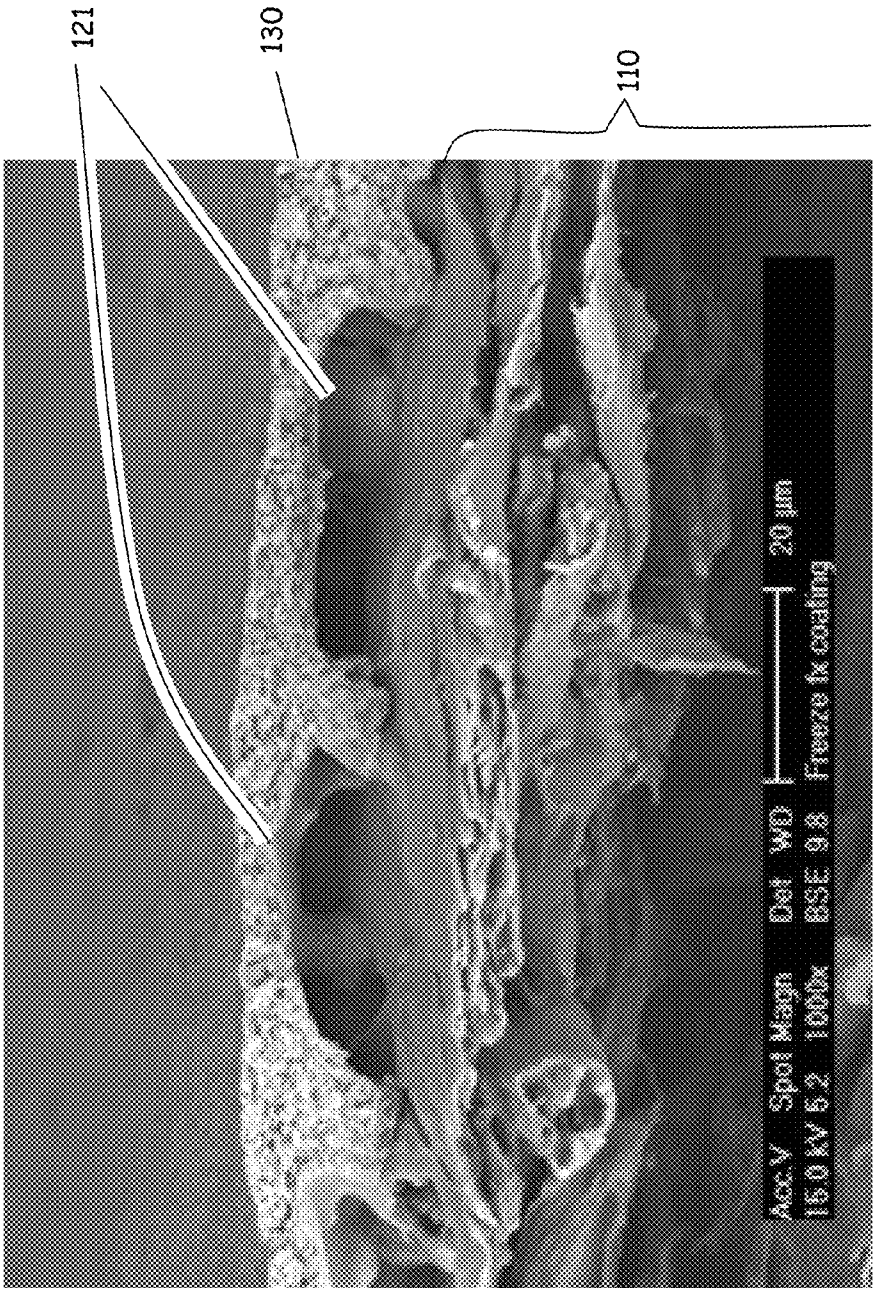

FIG. 3 is an example micrograph showing several voids 121 in the polymer coating layer. The voids appear to extend over an area equivalent to more than half the coated surface area. The polymer coating layer is not well defined in this micrograph.

Figure 4:
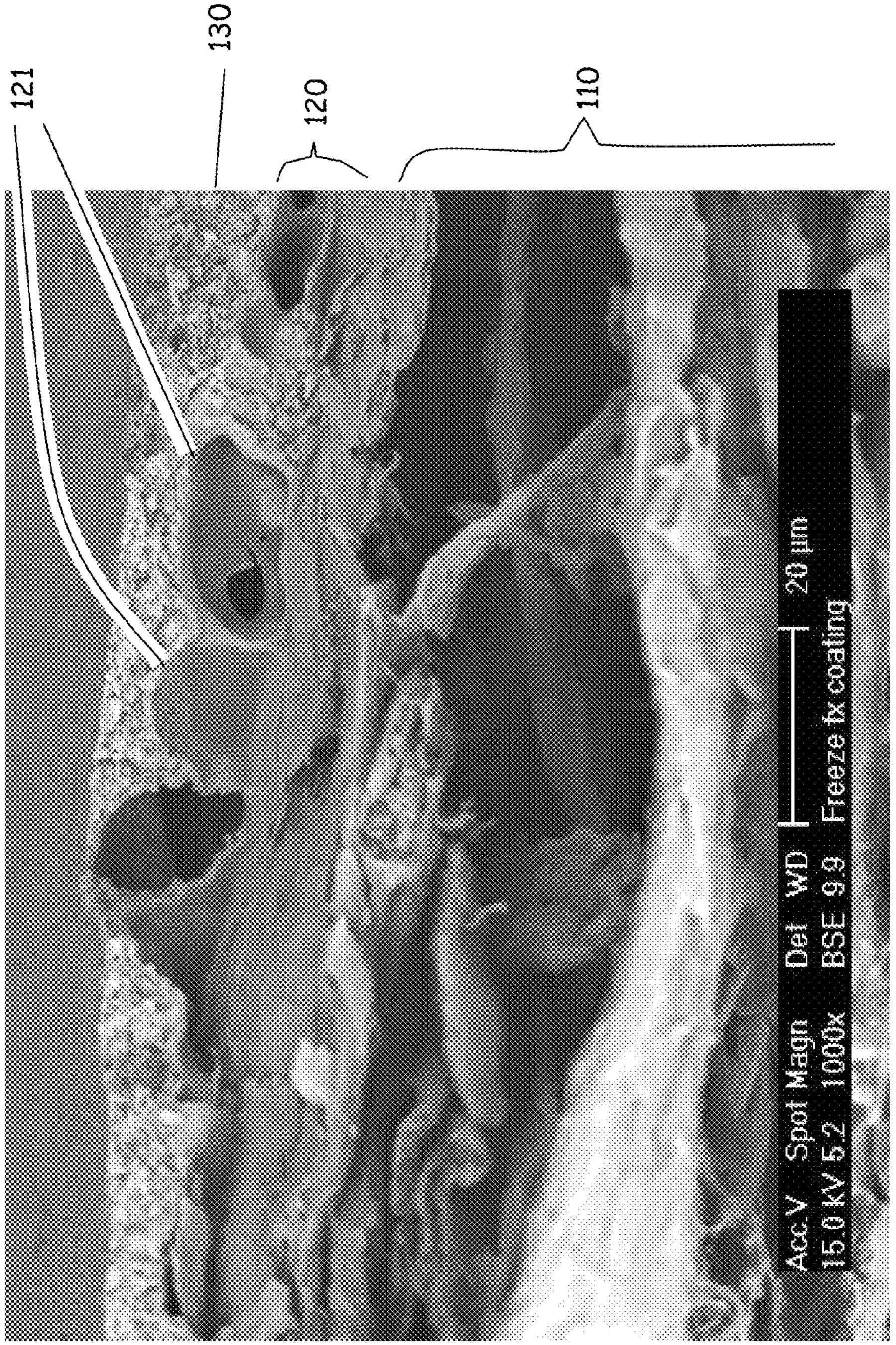

FIG. 4 is an example micrograph showing several voids 121 in polymer coating layer 120. The walls of the voids appear to be relatively thin, as evidenced by a somewhat translucent appearance in the walls of two of the voids.

Figure 5:
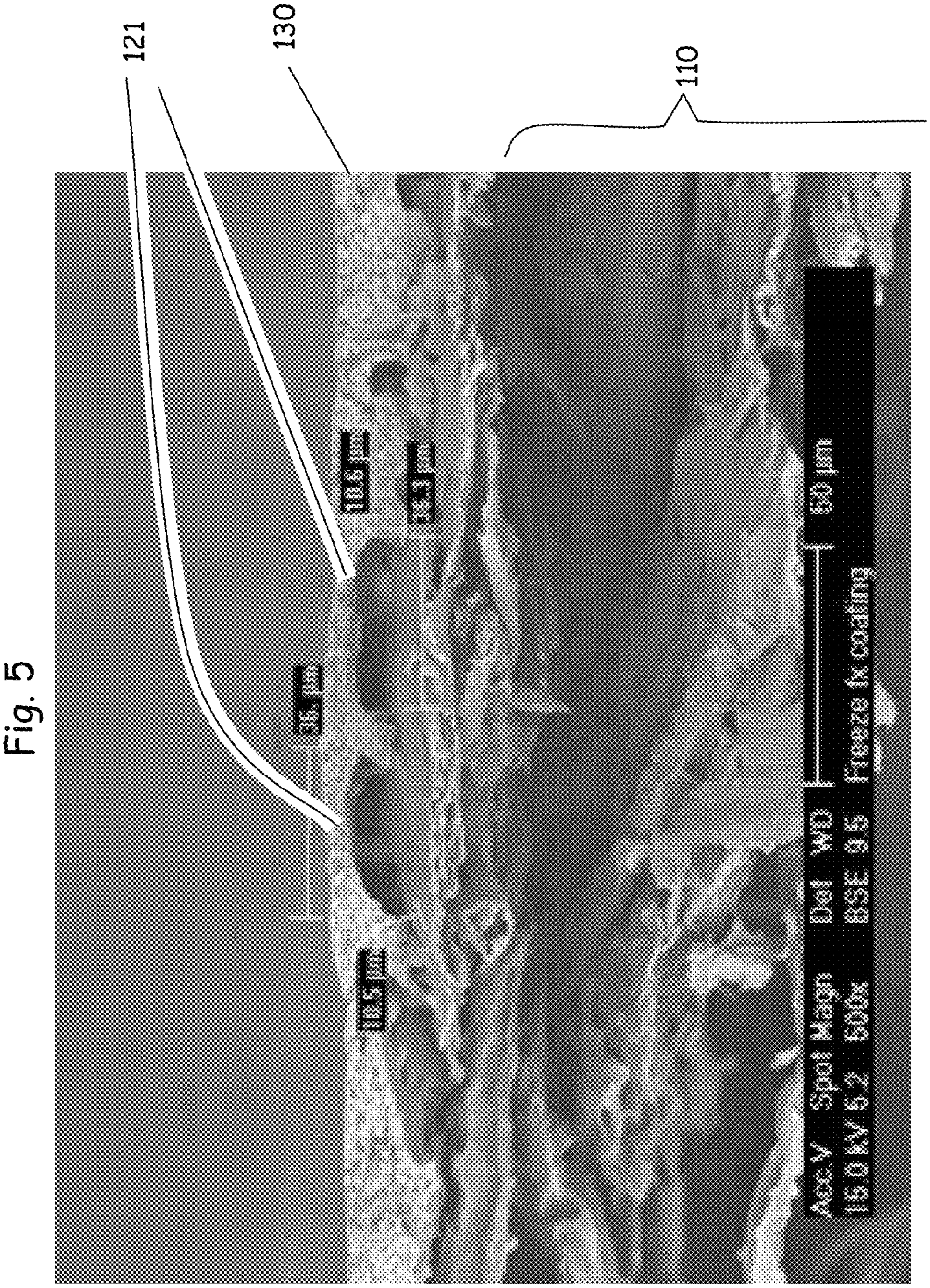

For FIGS. 5-9, the microscope magnification was 500 and the measurement bars are 50 microns long. FIG. 5 shows several voids 121 in polymer layer 120, with individual measurement bars showing dimensions of the selected voids, for example, moving generally from left to right, measurements of 10.5 microns in vertical distance, 36 microns in lateral distance, 10.6 microns in vertical distance, and 36.3 microns in lateral distance. Again the voids appear to extend over an area equivalent approximately half the coated surface area.

Figure 6:
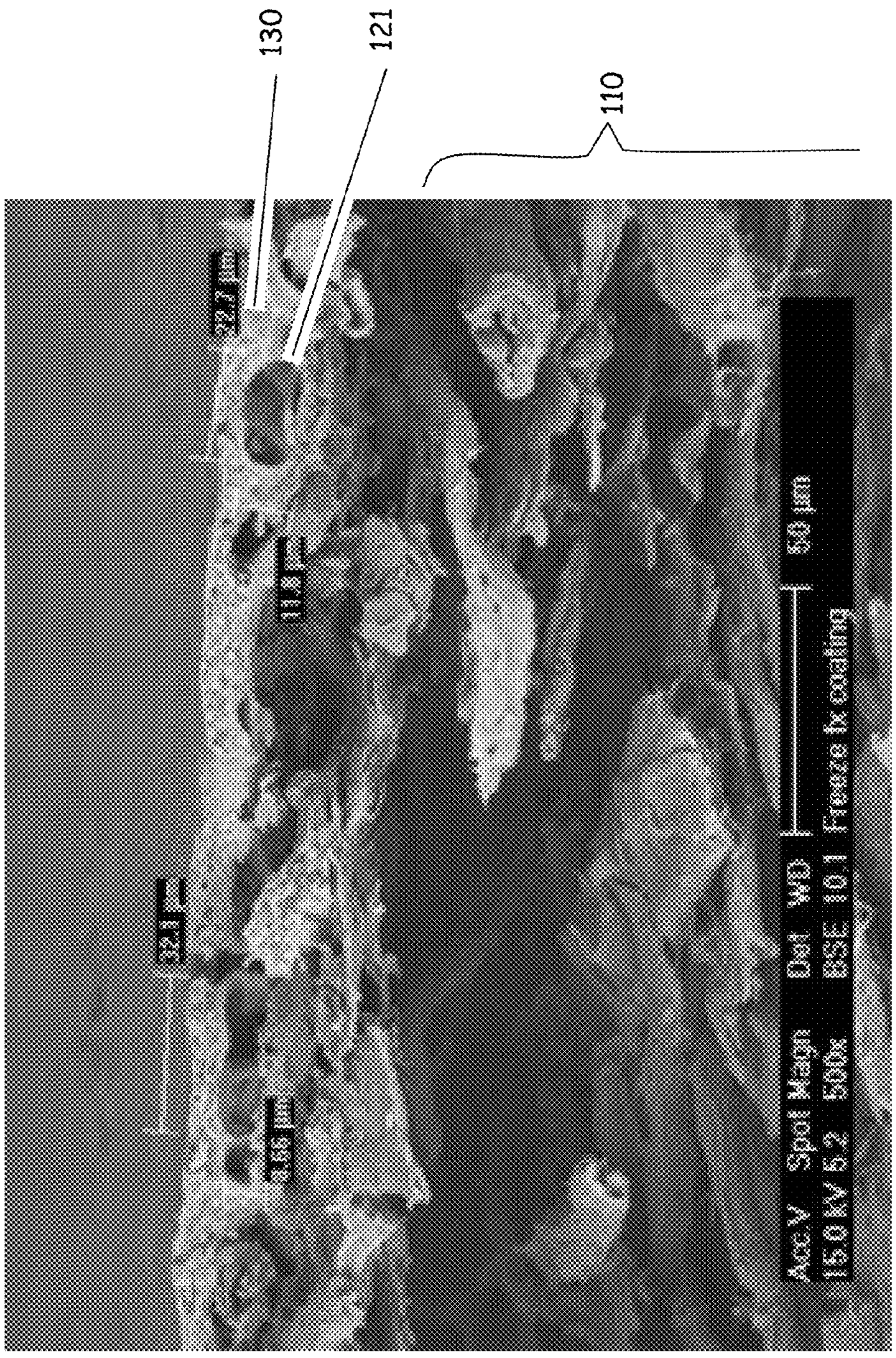

FIG. 6 shows another sample with similar measurement bars, for example, moving generally from left to right, measurements of 8.66 microns in vertical distance, 32.1 microns in lateral distance, 11.8 microns in vertical distance, and 22.7 microns in lateral distance. Measurements such as these in FIGS. 5 and 6 were collected for use in the graph discussed later in FIG. 17.

Figure 7:
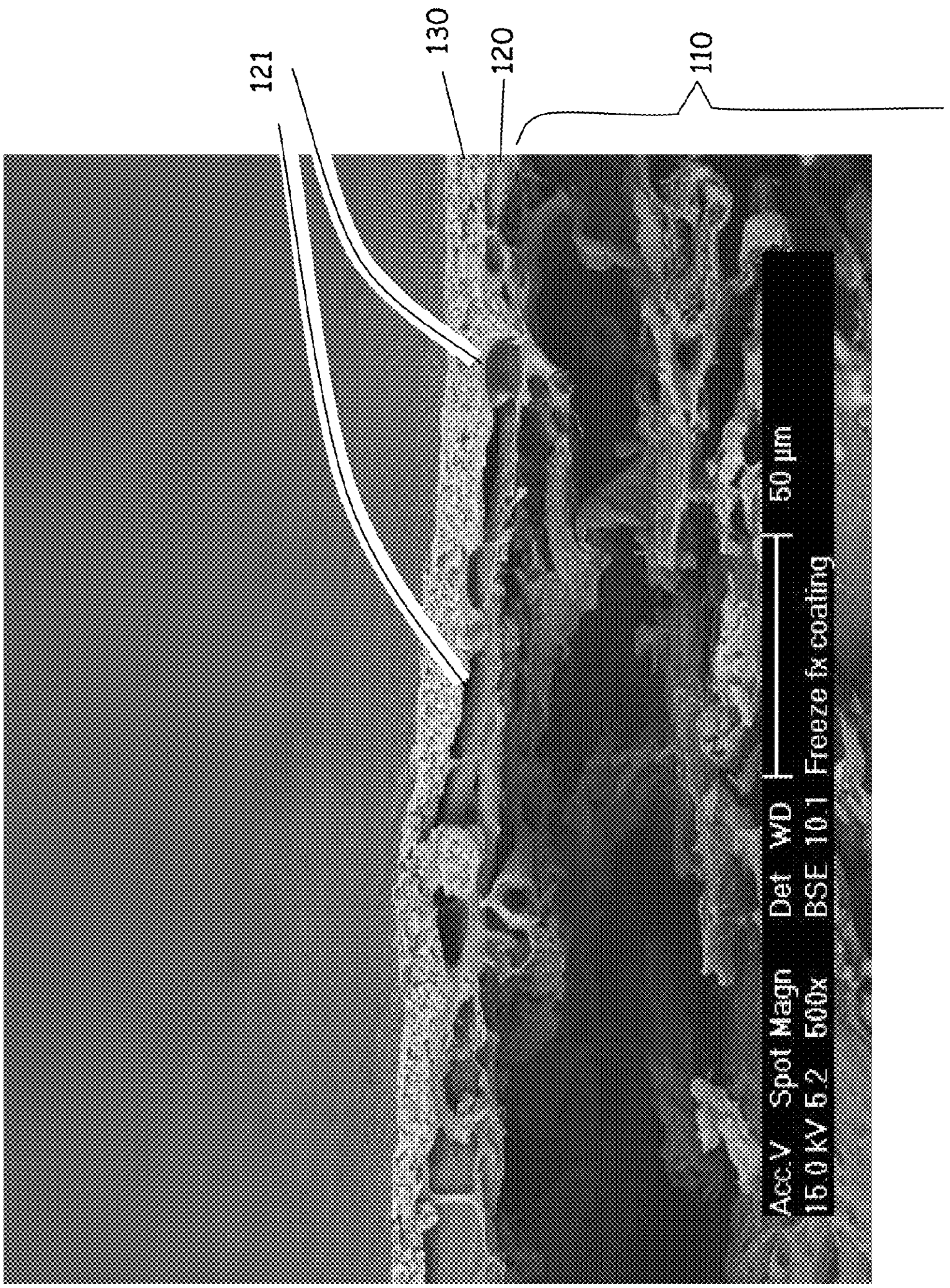
Figure 8:
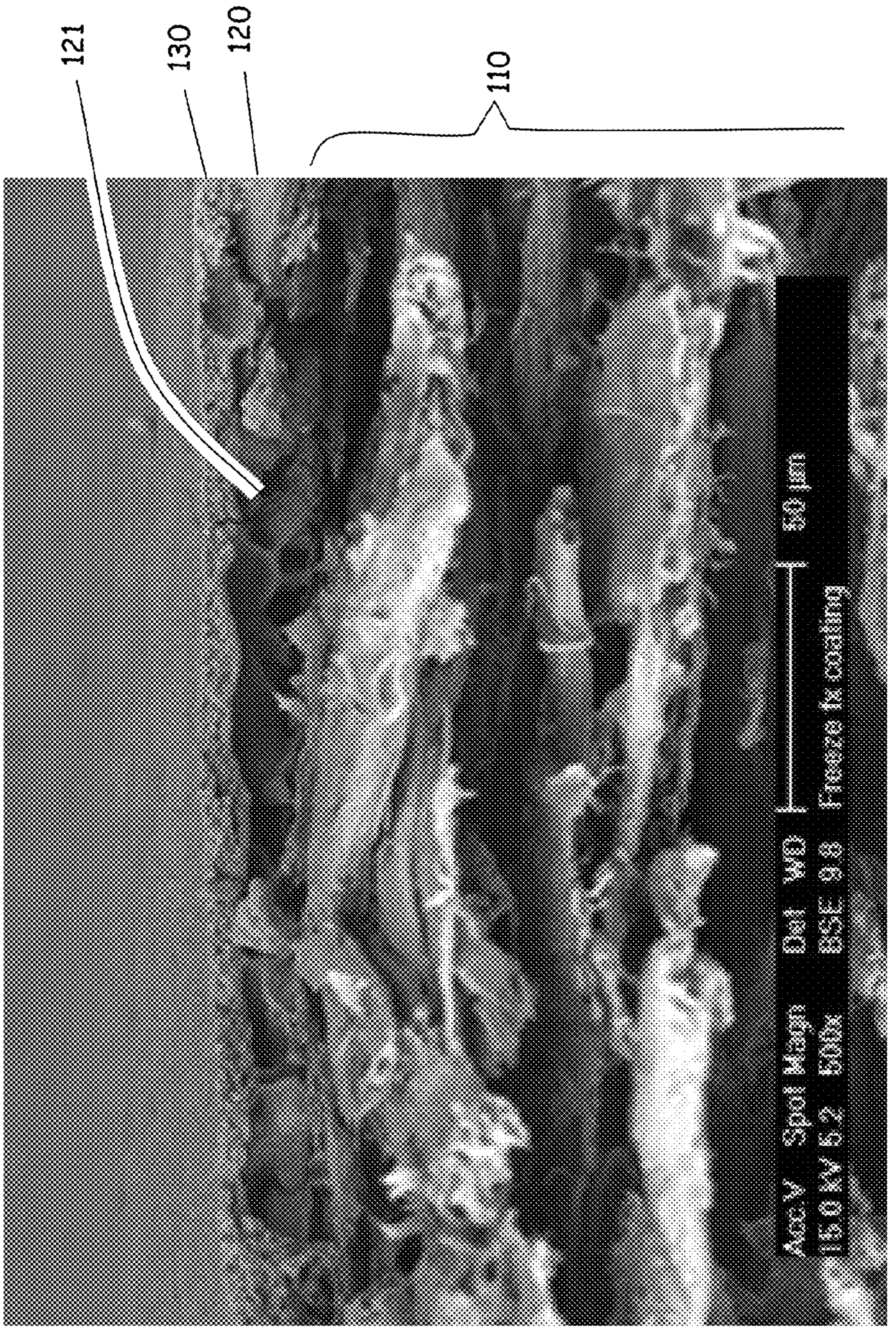
Figure 9:
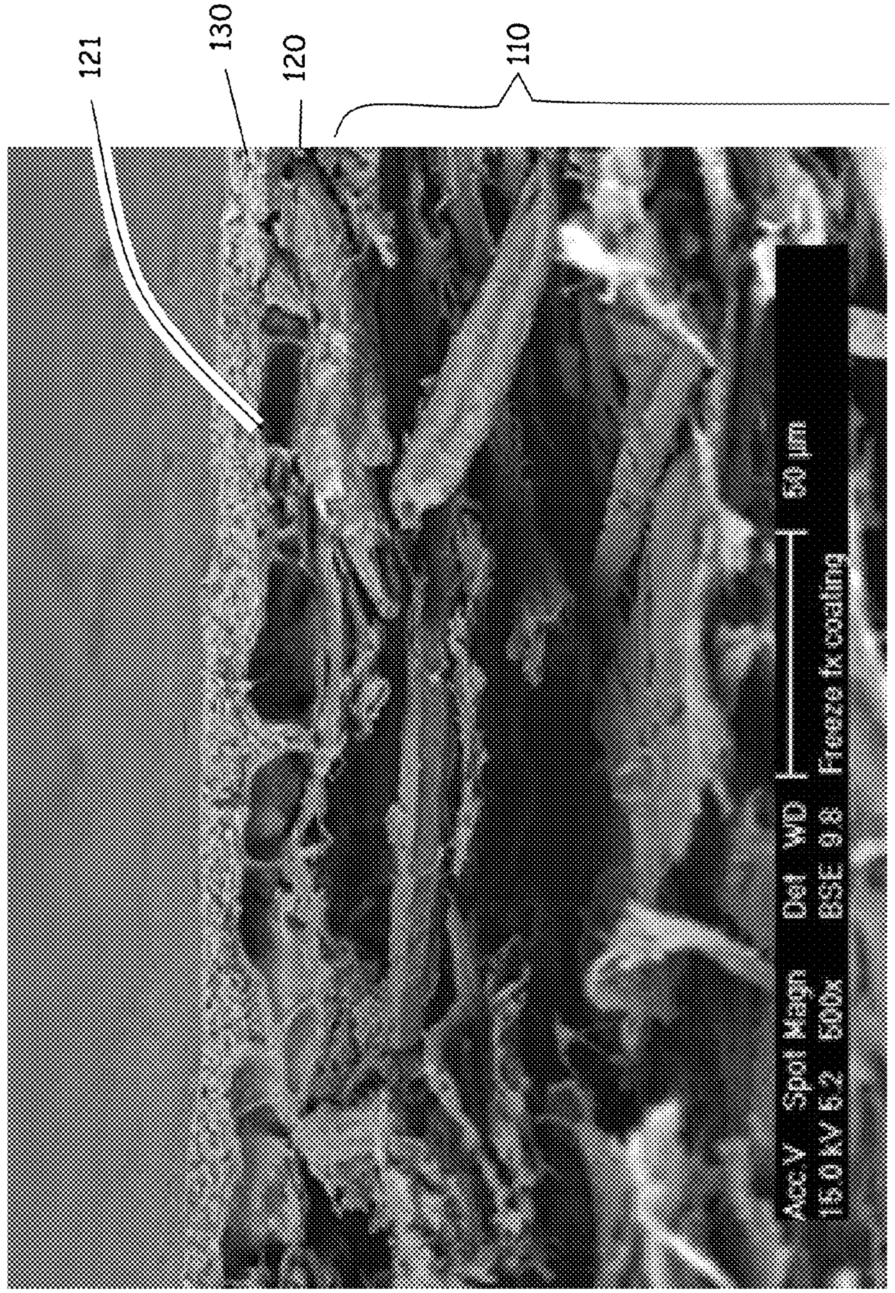

FIG. 7 shows voids 121 in polymer layer 120, including several showing a generally flattened aspect. The voids appear to extend over an area equivalent to nearly all the coated surface area. FIG. 8 shows another sample with similar widespread voids 121. The wall areas of several voids are visible. FIG. 9 shows yet another sample where the voids 121 appear to extend over an area equivalent to nearly all the coated surface area.

Figure 10:
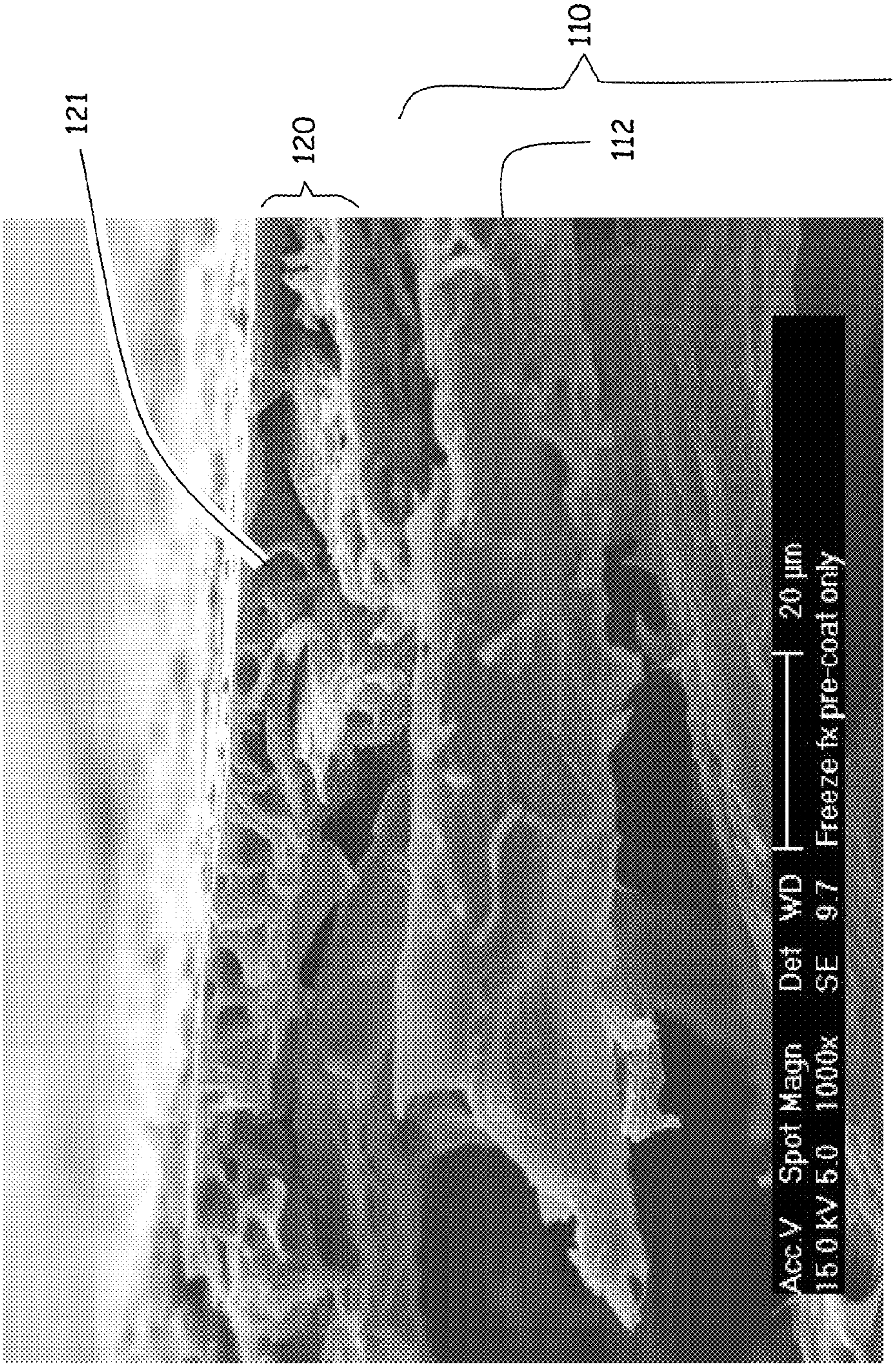
FIGS. 10-12 are cross section micrographs showing the morphology of samples made in accordance with one embodiment of the invention, and having no top coating.
Figure 11:
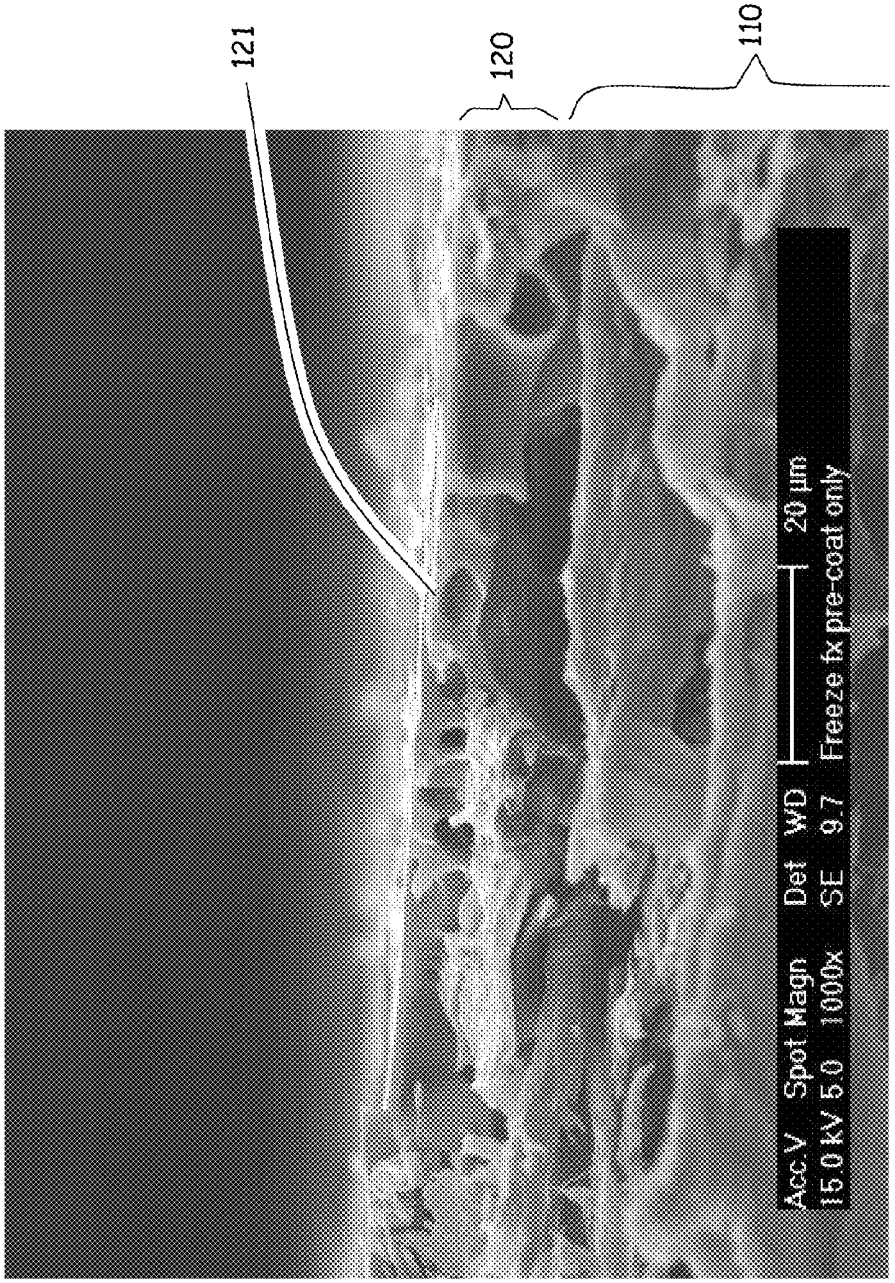
Figure 12:
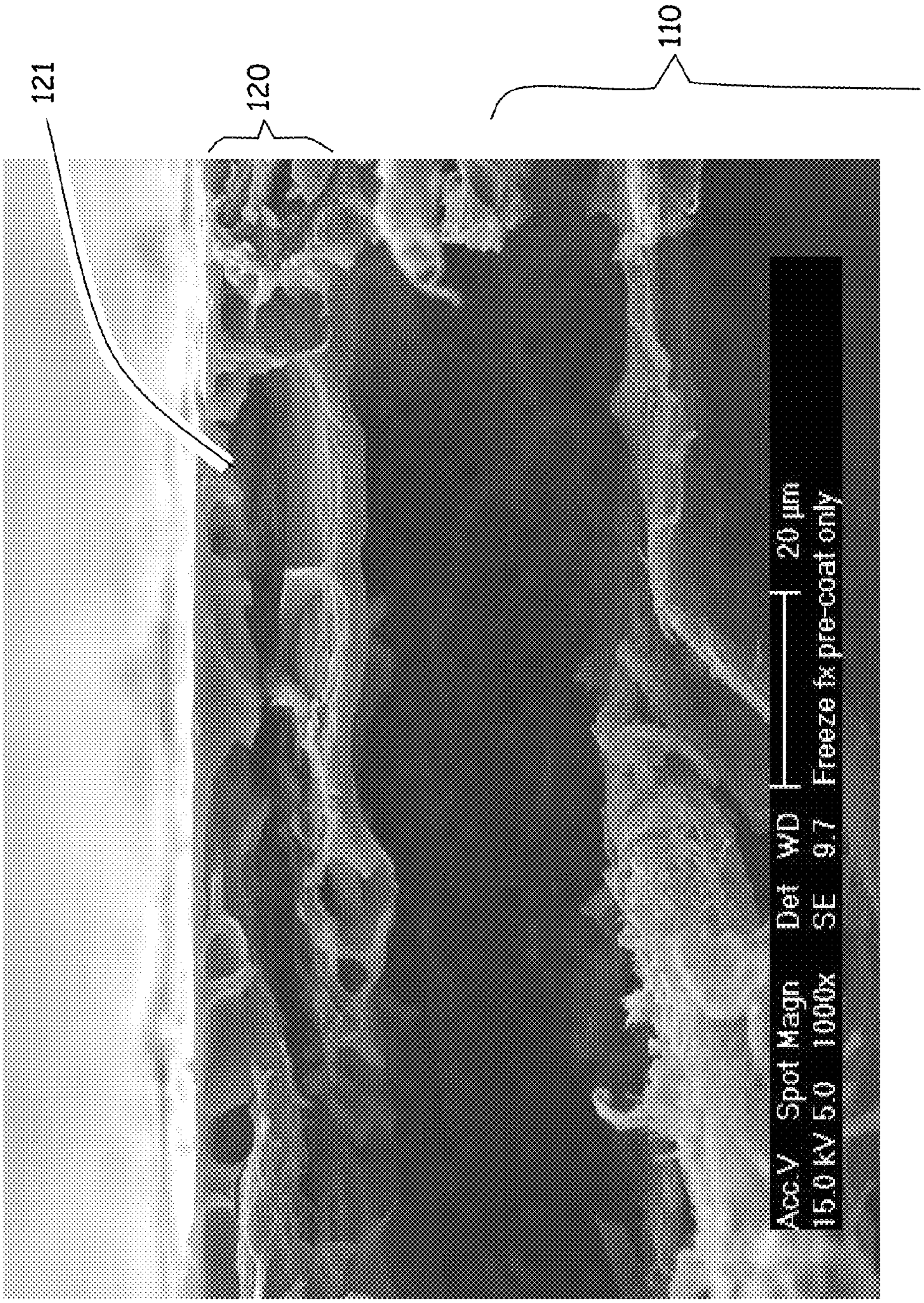

Other samples of the smooth products, produced using starch as the polymer coating, at 20% solids, were not top-coated. These samples were cross sectioned to examine the morphology of the coating layer. Cross sectioning was done by freezing the samples in liquid nitrogen, then cracking the samples in two (freeze fracturing). The cracked edges of the samples (e.g., the cross sections) were then viewed under a microscope as shown in FIGS. 10 to 12, which include measurement bars to indicate their scale. The microscope magnification was 1000, and the measurement bars are 20 microns long. FIG. 10 shows the polymer layer 120, which contains voids 121 and has a very smooth outer surface. The polymer layer is on paperboard substrate 110, and one of the cellulose fibers 112 is denoted. The substrate thickness generally extends below the area of the micrograph.

FIGS. 11 and 12 show additional micrographs of samples that were polymer coated but not top-coated. Again the smoothness of the polymer layer 120 is evident, as are the underlying voids 121. The walls of the voids often coincide with the surface of the polymer coating.

Figure 13:
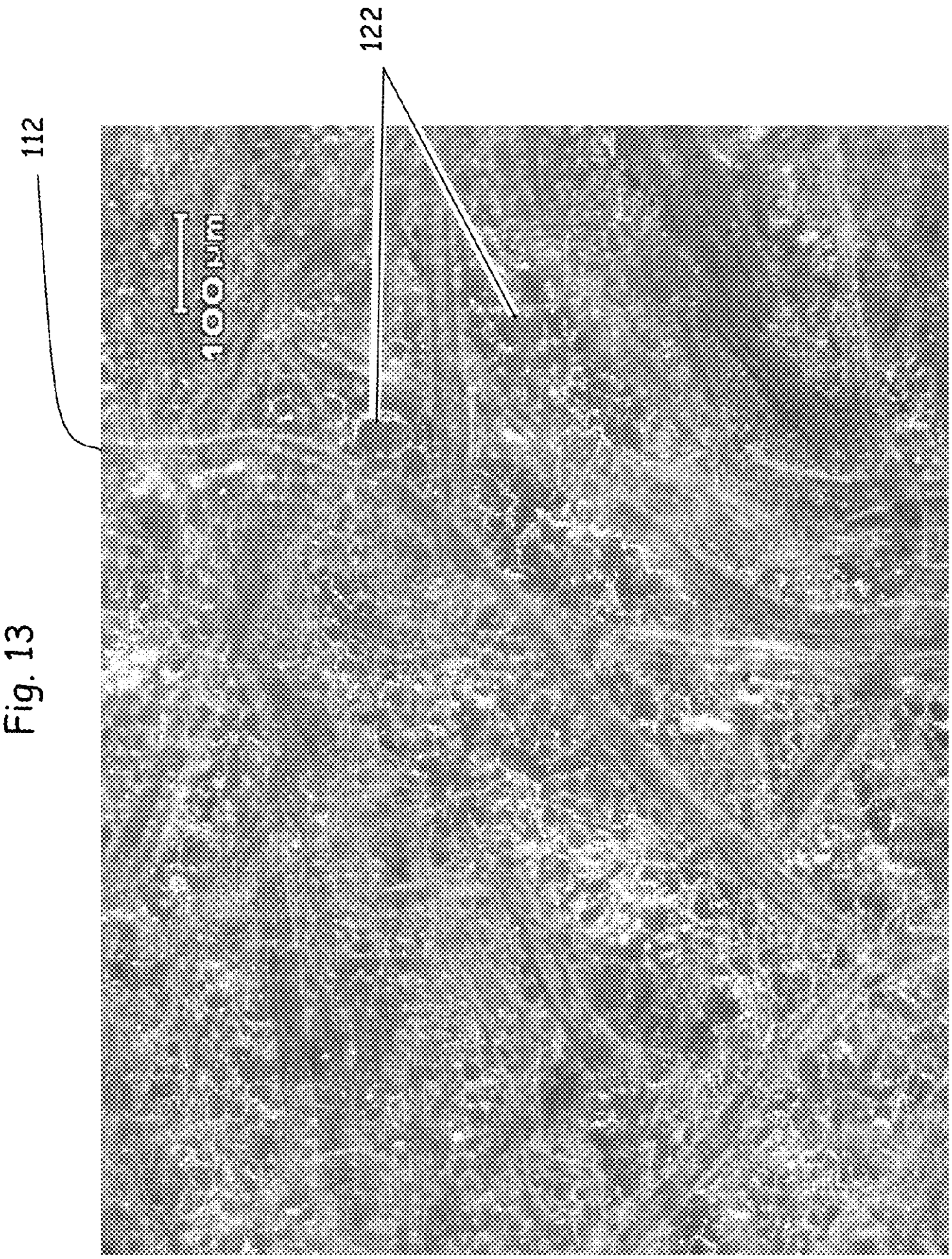
FIGS. 13-14 are surface micrographs made by scanning electron microscope showing the morphology of samples made in accordance with one embodiment of the invention, and having no top coating.
Figure 14:
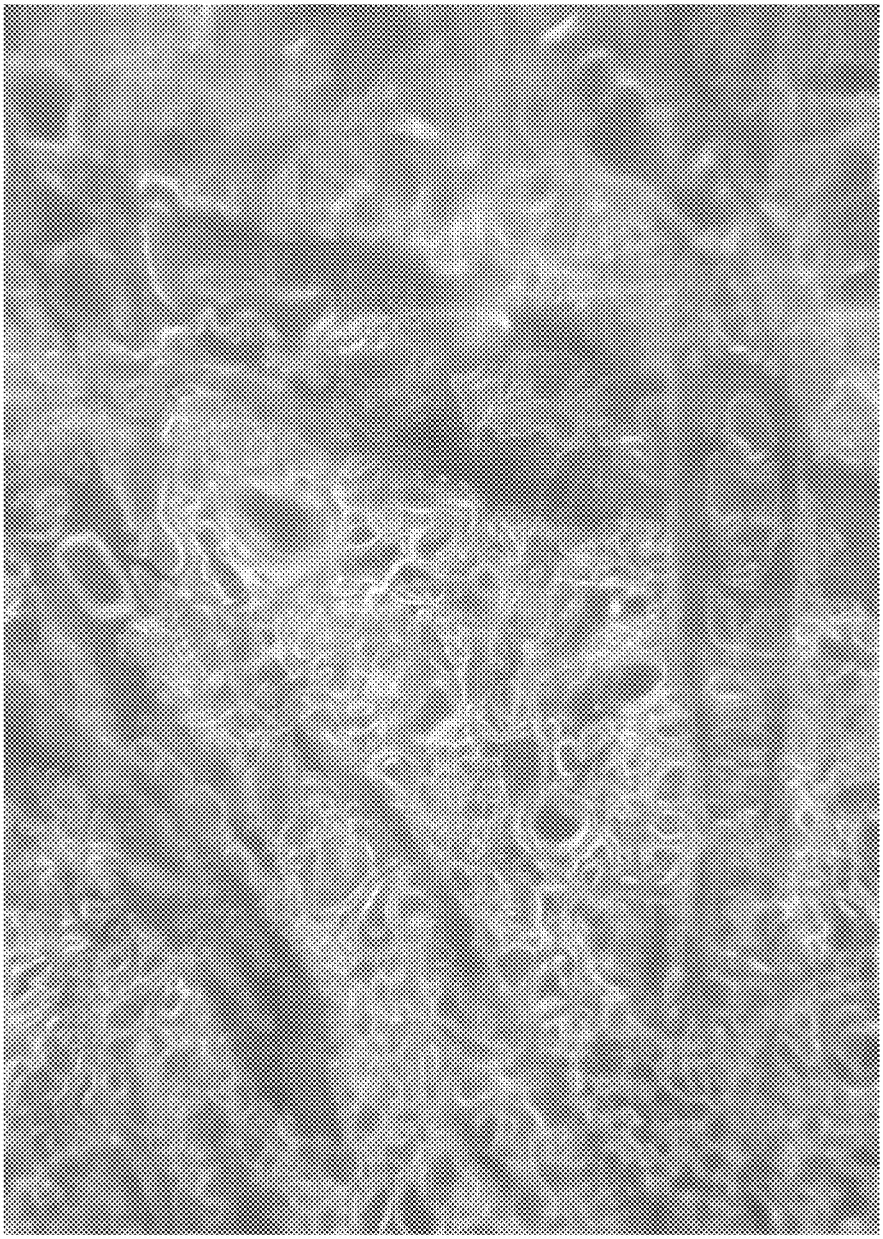

FIG. 13 (at 200× magnification) and FIG. 14 (at 500× magnification) show the surface of samples as seen under a scanning electron microscope. These samples were not given top coating 130. The larger string-like structures 112 are cellulose fibers of the substrate 110. The smaller cell-like structures 122 that appear as a fine network or mesh are individual voids in polymer layer 120. The polymer layer here appears essentially transparent, except for the walls of the voids.

Figure 15:
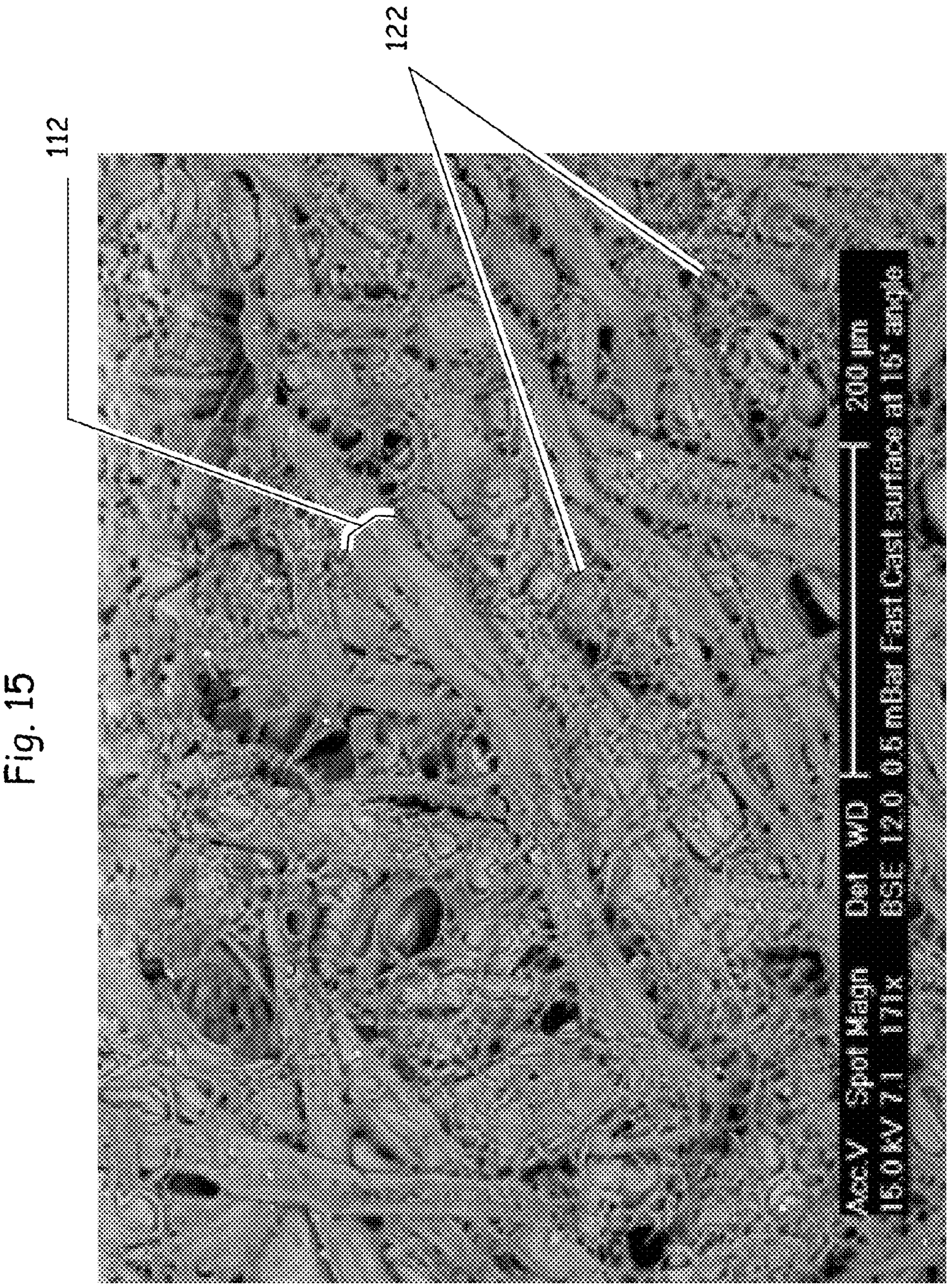
FIGS. 15-16 are surface micrographs made by backscatter scanning electron microscope showing the morphology of samples made in accordance with one embodiment of the invention, and having no top coating.
Figure 16:
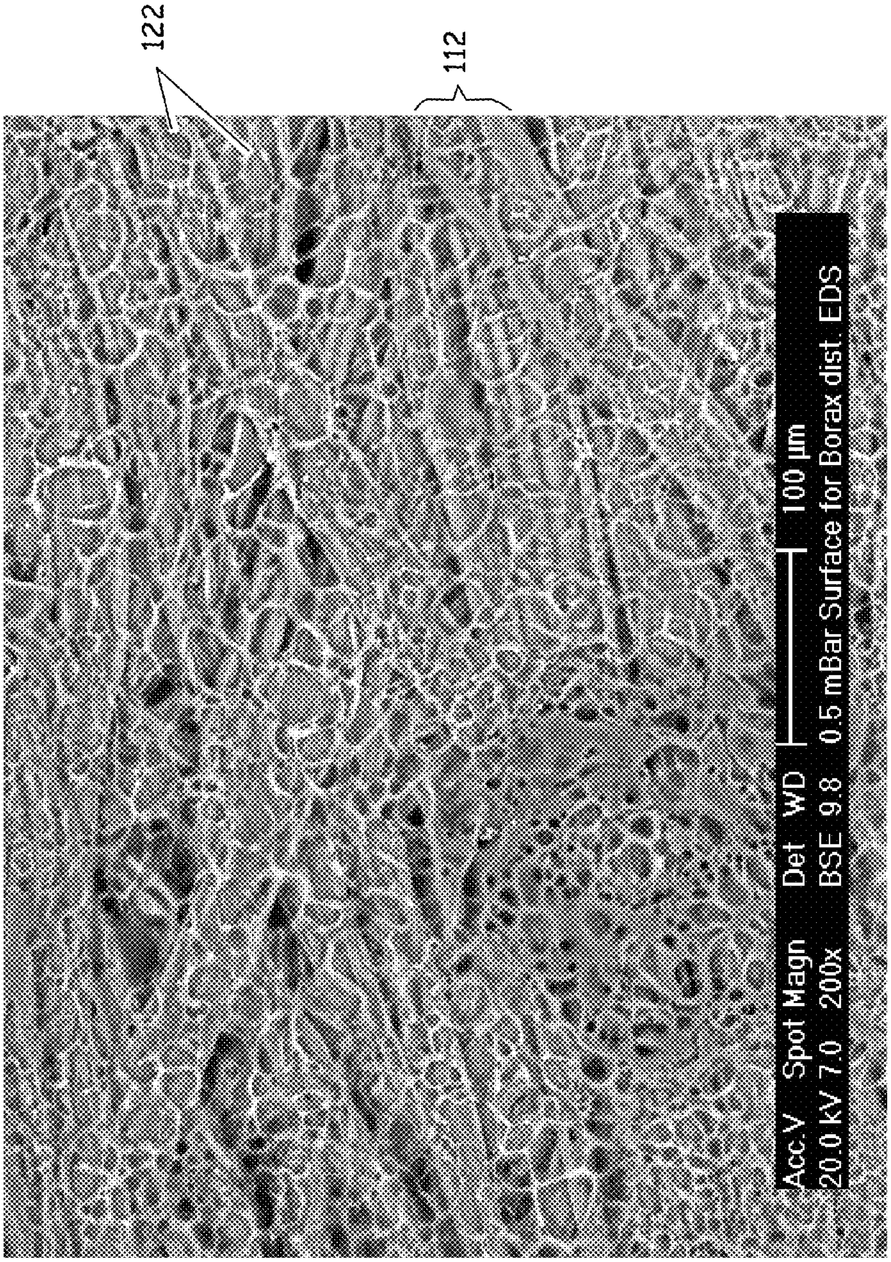

FIGS. 15 and 16 show the surface of samples as seen under a backscatter scanning electron microscope. These samples were not given top coating 130. The larger string-like structures 112 are cellulose fibers of the substrate 110. The smaller cell-like structures 122 that appear as a fine network or mesh are the walls of individual voids in polymer layer 120. The polymer layer here appears essentially transparent, except for the walls of the voids. The voids appear to be distributed over the entire surface.

Figure 17:
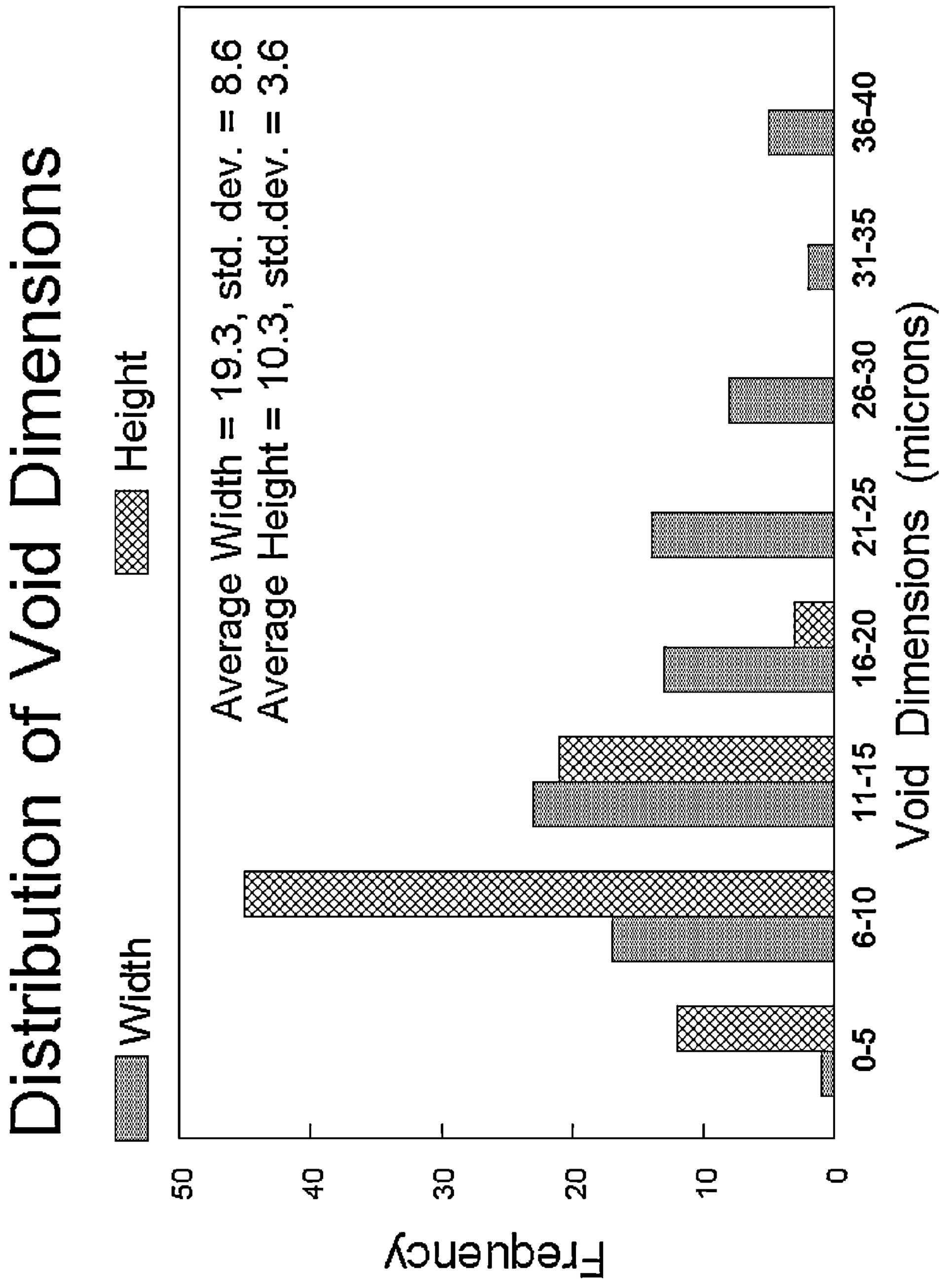
FIG. 17 is a graph showing distribution of void dimensions in samples made in accordance with one embodiment of the invention.

FIG. 17 is a graph showing the distribution of void sizes based on approximately 90 measurements each of void width (lateral dimension) and height (vertical dimension in the micrographs). The measurements show an average void width (measured in the direction parallel to the thickness of the sample) of about 19 microns, with a standard deviation of about 9 microns. The measurements show an average void height (measured in the direction going "into" the sample thickness) of about 10 microns, with a standard deviation of about 4 microns.

These void dimensions appear to be representative of the samples studied here. However, they are not meant to be limiting as changes in materials or processing conditions might give other dimensions.

It is difficult to directly observe or measure processes within the nip, but it appears that steam bubbles create these voids while the coating is in contact with the heated drum, and that the bubbles may provide a force to help keep the coating in contact with the drum. The resulting voids typically help bridge the gap between an otherwise rough substrate layer 110, and the smooth surface of the heated drum. Thus the dried polymer coating has a smooth replicated surface, which is smoother than the substrate layer 110. It appears that many or most of the voids remain intact when top coating 130 is applied. Therefore the top coating ends up smoother because of the relatively smooth underlying polymer layer 120. This is seen as an advantage achieved by the invention. Besides the influence of the voids on help creating a smooth replicated surface, the voids also contribute to a lower density in the product.

The conditions in the nip between press roll 24 and hot drum 22 influences whether voids form in the polymer coating. Depending on press roll hardness, and the diameters of the press roll and hot drum, it may be necessary to adjust the nip loading (for example, the PLI loading on the nip) in order to achieve boiling in the nip which creates the voids.

Figure 18:
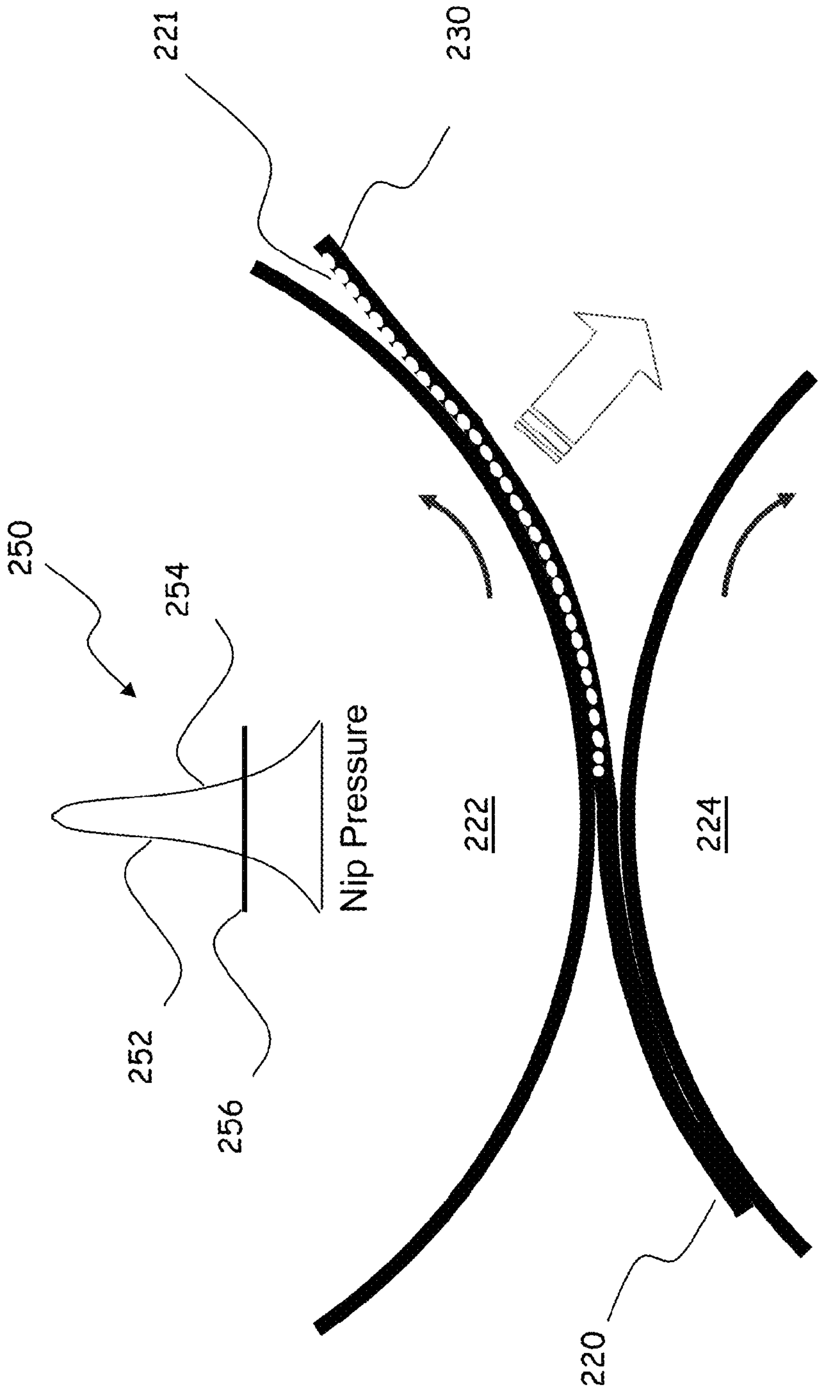
FIG. 18 is a detail view of an apparatus for treating a substrate with a polymer coating in accordance with certain embodiments of the present invention.

Based on results of our experiments, the replication process seems to occur in the following manner, as depicted in FIG. 18. Polymer coated substrate 220 enters the nip between press roll 224 and hot polished drum 222. A nip pressure profile 250 exists between the hot polished drum and the press roll. The nip pressure profile has an ingoing portion 252 and an outgoing portion 254. The shape of nip pressure profile 250 is meant as an example only. A nip local pressure exists at any point on the profile, and the nip local pressure may vary going through the nip, as shown by the nip pressure profile 250. For example, it may increase on the ingoing side of the nip, then decrease on the outgoing side of the nip. A nip average pressure 256 also exists.

On the ingoing side of the nip, a high heat transfer rate occurs due to the intimate contact between the hot polished drum 222 and the polymer coated substrate 220, and due to a high temperature difference between the hot drum and the polymer coated substrate. Also on the ingoing side of the nip, the pressure is increasing and thus does not allow the coating to vaporize, but instead imparts superheat to the liquid phase. On the outgoing side of the nip, heat transfer is still very high, but the pressure is decreasing and at some point in the outgoing nip, the liquid phase can flash (boil) to vapor and create a high volume of voids 221 in the coating layer, which helps replicate the surface of the hot polished drum 222. Because the liquid was superheated, that is, heated beyond its atmospheric-pressure boiling point, there is sufficient energy not only to vaporize liquid and create bubbles or voids, but also enough energy to sufficiently dry the polymer coating (such as around the bubbles, for example in the walls of the bubbles) so that upon leaving the nip, the coating with its voids and smooth surface retains its structure. The vapor, as its escapes from the coating layer, may thus help dry the coating. Shortly after leaving the nip, the web 230 releases from the hot drum and the surface replication process is complete. In a preferred embodiment, water in the coating is vaporized to form the voids. However, other embodiments may utilize liquids other than water to vaporize in the nip and form voids in the coating.

Preferably the pressure in the nip is great enough to promote a high rate of heat transfer, and lead to a superheated condition in the coating. However, if the pressure is too great, it may lead to a reduction in caliper, which is not desired. Excess pressure might possibly force coating into the substrate to the extent that there is poor surface replication. Thus it appears that there are optimum ranges of temperature (high enough to provide enough heat for vaporizing and drying), pressure (high enough to promote high heat transfer and superheating, but not so high as to drive too much coating into the substrate), and nip dwell time (high enough to allow sufficient heat transfer to occur).

The process depicted in FIG. 18 occurs within a certain range of hot drum temperatures and nip widths (related to time in the nip). The basic equation describing the heat transfer is: $q=h(T_s-T_{sat})$, where q is the heat transfer rate, h is the heat transfer coefficient, $T_s$ is the temperature of the heated surface, and $T_{sat}$ is the saturated temperature of the liquid. $T_{sat}$ is a function of pressure. For convenience, the temperature difference $(T_s-T_{sat})$, is sometimes termed the delta T (ΔT).

Figure 19:
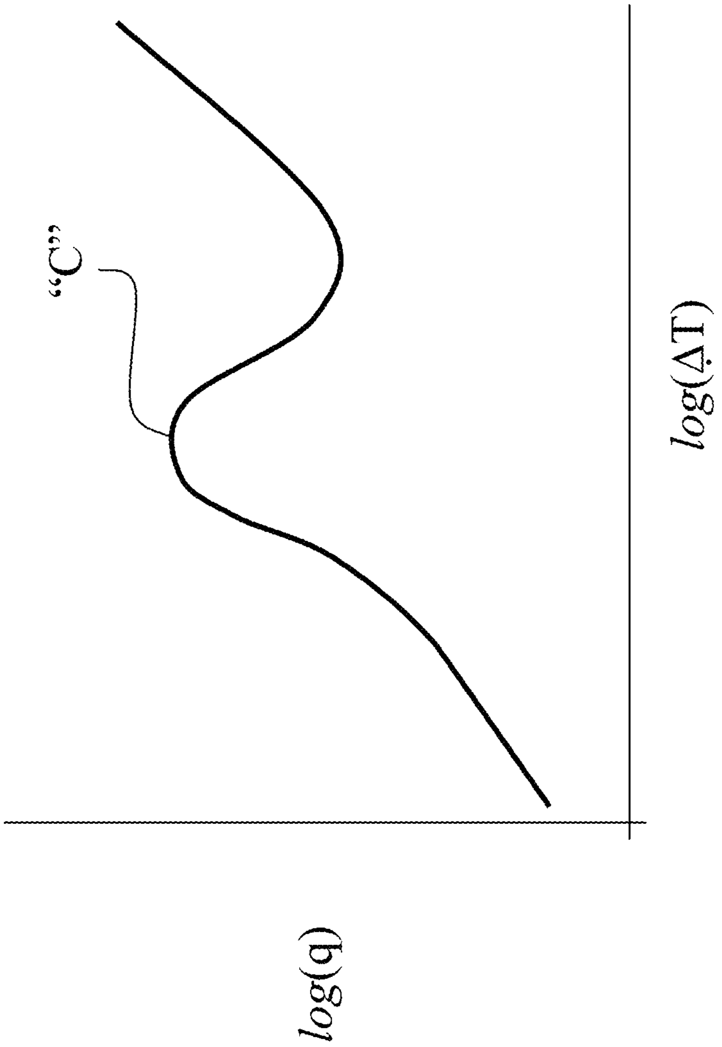
FIG. 19 is a graph showing a relationship between heat transfer rate and temperature difference.

FIG. 19 shows an exemplary graph of heat transfer q from a heated surface to a liquid undergoing phase change. The heat transfer behavior as depicted in FIG. 19 is a well known phenomenon. The log-log graph shows heat transfer rate q vs. temperature difference ΔT. The notation "C" denotes a maximum or "critical" heat transfer rate. For boiling water, this maximum heat transfer rate may occur at a ΔT of about 50° C. It is understood that the critical heat transfer rate for a polymer coated substrate in a pressure nip may differ from this particular ΔT, but the general shape of the graph, and the underlying physics, may still apply.

At a ΔT sufficiently below that associated with the critical heat transfer rate, heat transfer may be insufficient to supply the energy required to vaporize enough water from the coating to achieve surface replication. Furthermore, as shown in FIG. 19, as ΔT increases past the point "C" associated with critical heat transfer rate, enough vapor may be formed at the hot surface to begin to inhibit heat transfer, due to a reduced heat transfer coefficient.

For operation at about 800 fpm, and coat weights (dry basis) between about 2.8 to 3.6 lb/3000 ft$^2$, a heat transfer rate from about 9 to 10 kilojoules per square foot gives acceptable results. This appears to be about the amount of heat to dry the coating. As coat weight increases, the amount of heat required per square foot would be expected to increase accordingly.

Because of the heat transfer behavior illustrated in FIG. 19, it is expected that there will be an optimum temperature range around point "C" for achieving best surface replication. This temperature range may depend on pressure within the nip. It appears that the optimum hot drum temperature is in the range of 200-260° C. (400-500° F.) for a typical aqueous polymer solution or pigmented coating. If a material used in the coating changes the vapor pressure (for example, ammonia or an alcohol) then the temperature range might be lowered.

For the process to run over a range of speeds from benchtop speeds to production speeds of 2000 fpm or more, it is advantageous to know, and even to control, the time in the nip during which the process may replicate the drum surface onto the coating. The classic Hertzian equation for nip width between two rolls is $$w=\sqrt{\frac{2L}{\Pi}*\frac{d_1*d_2}{d_1+d_2}*\left(\frac{1-v_1^2}{E_1}+\frac{1-v_2^2}{E_2}\right)}. \qquad \text{EQUATION 1}$$

w=Nip width (inches)
L=Nip load (pounds per linear inch, PLI)
$E_1$, $E_2$=Moduli for rolls 1, 2 (psi)

$d_1$, $d_2$=Diameters of rolls 1, 2 (inches)

$v_1$, $v_2$=Poisson's ratio for rolls 1, 2

As someone skilled in the art would recognize, certain of these variables, such as the moduli or the Poisson's ratios, may be influenced by temperature. This in turn, according to Equation 1, would influence the nip width. Those skilled in the art will also recognize that to provide a better fit to particular conditions, the equation may be modified, for example based on empirical data, or an alternative equation may be used.

In the embodiments described herein, the nip dwell time appears to be an important parameter. Along with delta T, it plays an important role in determining the amount of energy transferred in the nip. The hot drum temperature $T_s$ and the nip pressure may be controlled to achieve operation near point "C" on the heat transfer curve, in order to maximize energy transfer. By appropriately adjusting pressure in the nip, boiling may initially be inhibited (for example on the ingoing side of the nip where the pressure is increasing) so that a very high heat transfer rate occurs, allowing an excess of energy to be transferred to the coating. This excess energy may be described as "superheat." As the substrate moves forward and the pressure decreases on the outgoing side of the nip, the saturation pressure $T_{sat}$ (which is a function of pressure) rapidly decreases and superheated water flashes as steam.

The delta T may preferably be optimized. For example to run at a certain speed, parameters such as roll diameter and hardness, and nip load, may be chosen to obtain sufficient dwell time. Operating conditions may be chosen to achieve a desired delta T, for example, to operate close to a target value, such as 50° C.

Equation 1 (or a similar equation or equations) can be used, along with physical properties and dimensions of the rolls, to determine suitable operating conditions to give an appropriate time in the nip. Because of the interactions of the different variables, some trial and error may be required to optimize the process. When work with a bench scale apparatus has determined a suitable combination of hot drum temperature, nip pressure, and dwell time for making acceptable product with the desired void-containing coating, then theory may be used to determine approximate operating conditions for a larger scale apparatus.

As an example, assume that a bench scale apparatus makes acceptable product using a hot drum temperature of about 220° C. (425° F.), for a specific nip pressure and nip dwell time. For a first approximation, it may be assumed that equivalent conditions may produce satisfactory product on a larger apparatus such as production equipment. Preferably the larger apparatus will be capable of running with a hot drum temperature of about 220° C. Knowing the desired operating speed, and the suitable nip dwell time, a target nip width may be calculated.

Having determined the target nip width, an equation such as Equation 1 (or other suitable theoretical, empirical, or otherwise derived equation) may be used to directly, indirectly, iteratively or otherwise determine one or more sets of operating conditions for the production equipment that will result in the desired target nip width. Among the factors to consider are the diameters of the hot drum and the press roll, the hardness of the press roll (or the hardness and thickness of its cover), and the operating ranges available for loading the nip (e.g. the PLI range of the apparatus). These factors may apply to the existing in-place equipment, or to replacement equipment that may be used instead. For example, using Equation 1, a list of candidate press roll covers may be created, which each by virtue of their respective thickness and hardness are suitable for providing the target nip width. An appropriate one of the candidate press roll covers may then be chosen, for example based on availability, durability at a given temperature, surface properties, etc.

The contact time of the polymer coated substrate with the hot drum surface includes the nip dwell time and may also include additional time, preferably after leaving the nip, during which the substrate is in contact with the hot drum surface.

Results for experiments running on pilot equipment are summarized in Table 2. The hot drum had a diameter of 46" with a tungsten carbide surface polished to a 2 micron finish. The press roll has a diameter of 38" with a 30 Shore D soft covering. The web width was 36" and nip load about 570 PLI. This would provide an estimated average nip pressure of about 500 psi. The base substrate was a bleached board with a nominal basis weight of 204 lb/3000 $ft^2$. Coatings were applied to the web using a rod coater prior to contact with the heated drum. Example A used a coating made up of 97% by weight CLEER-COTE, (made by A.E. Staley, a division of Tate & Lyle) low viscosity starch and 3% of a homogenized vegetable oil release agent (triglyceride Emtal 50 VCS). The coating solids were 17.1%. Example B used a PG270 (made by Penford Products) medium viscosity starch at 97% by weight with 3% vegetable oil release agent. Although the caliper of the Example B basesheet was less than the caliper of the Example B treated board, this could be due to variability in the board.

The heated drum temperature was about 450° F. (about 230° C.) at a web speed of 800 fpm. At higher web speeds, the temperature was lower. As operating conditions are adjusted, the aqueous polymer coating may be optimized for the new conditions. For example, it appears that as speed increases, coating solids may be decreased slightly to provide best results.

The pilot conditions were run over a range of dwell times, depending on nip width and web speed. For example, good results were obtained at about 200 fpm with a nip dwell time of about 27 milliseconds, and at about 900 fpm with a nip dwell time of about 6 milliseconds. Less satisfactory results were obtained at about 1500 fpm with a nip dwell time of about 3 milliseconds. These dwell times correspond to a nip width of about 1.1 inches. On bench scale equipment, good results were obtained at about 25 fpm with a nip dwell time of about 60 milliseconds, corresponding to a nip width of about 0.3 inch. While speeds above about 1500 fpm have not been tested, it is possible that higher speeds might require longer dwell times, for example due to other operating factors, such as web moisture.

While certain of the conditions above gave satisfactory results, it is envisioned that the process may be adjusted to run under a variety of conditions. For example it is envisioned that operating conditions might be adjusted so as to permit satisfactory results at nip pressures between about 70 psi and about 700 psi, or more particularly between about 150 psi and 550 psi.

Various heat sources may be used to heat the hot drum. For example, the heating may be by electrical resistance heating, electrical induction heating, gas-fired heating, hot oil heating, combinations of these, or other heating methods as are known in the art.

While the work described herein used a cylindrical hot drum and a cylindrical press roll forming a nip therebetween, it is contemplated that the process may also be practiced with other geometries capable of providing a heated pressure nip through which the substrate may pass. Other geometries that may be capable of providing a heated pressure nip may be embodied, for example, in belted shoe press or belted shoe calender equipment. The process disclosed herein was not tested using a belted shoe device, and suitable operating conditions would need to be determined. Belted shoe devices may have somewhat longer nips than would be found between a drum and press roll, and correspondingly longer nip dwell times. For these devices, dwell times may range from about 3 milliseconds (for example, with a two-inch shoe running at 3000 fpm) to about 225 milliseconds (for example, if an 18 inch shoe were available running at 400 fpm).

Certain descriptions of the embodiments herein use the terms "paper" or "paperboard" to describe the substrate. These terms are not meant to limit the type of substrate, as it is envisioned that the methods here may be suitable for various substrates including without limitation either paper or paperboard. The polymer-coated paper or paperboard created by this process may be used wherever a smooth substrate or finished product is desired. The polymer-coated paper or paperboard may be used as-is (e.g., as shown in FIGS. 10-16), or it may be used as a substrate for additional coatings or other treatments to be applied (for example the top coating 130 shown in FIGS. 2-9, or other coatings) thereon. Additional finishing materials or processes may be applied to the polymer-coated paper or paperboard, with or without additional coatings. For example, one or more additional coatings may be applied, as is typical with base coating, top coating, and triple coating of conventional paper or paperboard substrates. Calendering processes may be applied, before or after optional additional coating. For example one or more additional coatings may be applied, followed by a gloss calendering step.

Methods of making and using polymer-coated material in accordance with the invention should be readily apparent from the mere description of the material and process as provided herein. No further discussion or illustration of such material or methods, therefore, is deemed necessary.

While preferred embodiments of the invention have been described and illustrated, it should be apparent that many modifications to the embodiments and implementations of the invention can be made without departing from the spirit or scope of the invention. Although the preferred embodiments illustrated herein have been described in connection with a paper or paperboard substrate, these embodiments may easily be implemented in accordance with the invention in other structures, including without limitation textiles, non-woven fabrics, fibrous materials, polylactic acid substrates, and porous films.

It is to be understood therefore that the invention is not limited to the particular embodiments disclosed (or apparent from the disclosure) herein, but only limited by the claims appended hereto.

TABLE 2

Samples and Test Conditions

| Coat Weight ($lb/3000\ ft^2$) | Caliper (0.001") | Sheffield Smoothness (Sheff units) | Parker PrintSurf 10 kg Smoothness (microns) | Speed (fpm) | Drum Temperature (° F.) |
|---|---|---|---|---|---|
| Example A | | | | | |
| Basesheet | 19.0 | 281 | 6.9 | | |
| 3.5 | 18.4 | 143 | 3.4 | 800 | 455 |
| 3.6 | 18.5 | 125 | 3.5 | 900 | 432 |
| 3.6 | 18.3 | 123 | 3.5 | 1000 | 421 |
| 3.6 | 18.5 | 145 | 3.6 | 1100 | 419 |
| 3.7 | 18.4 | 128 | 3.7 | 1200 | 413 |

TABLE 2-continued

Samples and Test Conditions

| Coat Weight ($lb/3000\ ft^2$) | Caliper (0.001") | Sheffield Smoothness (Sheff units) | Parker PrintSurf 10 kg Smoothness (microns) | Speed (fpm) | Drum Temperature (° F.) |
|---|---|---|---|---|---|
| 3.7 | 18.6 | 117 | 3.8 | 1300 | 406 |
| 3.8 | 18.5 | 133 | 3.9 | 1400 | 399 |
| Example B | | | | | |
| Basesheet | 18.2 | 249 | 6.6 | | |
| 2.2 | 18.5 | 165 | 3.5 | 800 | 451 |
| 2.2 | 18.6 | 143 | 3.7 | 1000 | 434 |
| 2.2 | 19.0 | 158 | 4.0 | 1200 | 419 |
| 2.3 | 18.9 | 168 | 4.6 | 1400 | 407 |

What is claimed as new is:

1. A process for treating a substrate, comprising the steps of:

applying to the substrate a film of an aqueous polymer solution, the film having an exposed outer film surface; and immobilization of the aqueous polymer solution by bringing the aqueous polymer solution into contact with a heated surface so as to form voids having a transverse dimension of more than 5 microns and occupying an area equivalent to more than 50% of the area of the exposed outer film surface, wherein the voids are defined by the film and substantially all of the voids are formed wholly encapsulated within the film, and wherein the step of immobilization includes at least partially drying the aqueous polymer solution.

2. The process of claim 1, wherein the film is in contact with the heated surface for a time interval selected from one of the group consisting of less than about 3 seconds, less than about 2 seconds, and less than about 0.5 seconds.

3. The process of claim 1, wherein the film of aqueous polymer solution is in contact with the heated surface for less than about 3 seconds and wherein the heated surface has a temperature above about 150° C.

4. A process for treating a substrate, comprising the steps of:

applying to the substrate a film of an aqueous polymer solution, the film having an exposed outer film surface, immobilization of the aqueous polymer solution by bringing the aqueous polymer solution into contact with a heated surface so as to form voids having a transverse dimension of more than 5 microns and occupying an area equivalent to more than 50% of the area of the exposed outer film surface, wherein the voids are defined by the film and substantially all of the voids are formed wholly encapsulated within the film, and wherein the step of immobilization includes at least partially drying the aqueous polymer solution.

5. The process of claim 4, wherein the film is in contact with the heated surface for a time interval selected from one of the group consisting of less than about 3 seconds, less than about 2 seconds, and less than about 0.5 seconds.

6. The process of claim 4, wherein the film of aqueous polymer solution is in contact with the heated surface for less than about 3 seconds and wherein the heated surface has a temperature above about 150° C.

7. A process for treating a substrate, comprising the steps of:

applying to the substrate a first coating of an aqueous polymer solution as a film, the film having an exposed outer film surface, wherein the first coating includes a water soluble polymer and a release agent, bringing the film into contact with a heated surface in nip, the nip having a nip dwell time, a nip local pressure, and a nip average pressure, whereby during a first portion of the nip dwell time, the nip local pressure increases and the film undergoes heating with substantially no vapor formation, and during a second portion of the nip dwell time, the nip local pressure decreases and voids are formed having a transverse dimension of more than 5 microns and occupying an area equivalent to more than 50% of the area of the exposed outer film surface, wherein the voids are defined by the first coating and substantially all of the voids are formed wholly encapsulated within the first coating, and at least partially drying the film.

8. The process of claim 7, wherein the nip dwell time has a range of values selected from one of the group consisting of between about 1 millisecond and about 60 milliseconds, between about 4 milliseconds and about 25 milliseconds, and between about 6 milliseconds and about 10 milliseconds.

9. The process of claim 7, wherein the nip average pressure is in a range selected from the group consisting of between about 70 psi to about 700 psi and between about 150 psi to about 550 psi.

10. The process of claim 7, wherein the heated surface is at a temperature above about 150° C.

11. The process of claim 7, wherein the aqueous polymer solution contains essentially no elastomeric material.

12. The process of claim 7, wherein the substrate includes at least one of cellulose, paper, paperboard, fabric, fibrous material, porous material, porous film, or polylactic acid.

13. The process of claim 7, wherein the first coating includes by dry weight at least about 60% water soluble polymer and up to 10% release agent.

14. The process of claim 7, wherein the first coating includes at least one of starch, waxy maize, protein, polyvinyl alcohol, casein, gelatin, soybean protein, and alginate.

15. The process of claim 7, further comprising the step of applying a second coating after at least partially drying the film.

16. A process for treating a substrate, comprising the steps of:

applying to the substrate a first coating of an aqueous polymer solution as a film, the film having an exposed outer film surface, bringing the film into contact for less than about 3 seconds with a heated surface having a temperature above about 150° C., wherein the contact comprises a nipped contact with the heated surface, wherein the nipped contact has a nip local pressure associated therewith, wherein the nipped contact comprises a first duration during which the nip local pressure increases and the film undergoes heating with substantially no vapor formation, and a second duration during which the nip local pressure decreases and voids are formed having a transverse dimension of more than 5 microns and occupying an area equivalent to more than 50% of the area of the exposed outer film surface wherein the voids are defined by the first coating and substantially all of the voids are formed wholly encapsulated within the first coating.

17. The process of claim 16, wherein the first coating includes a water soluble polymer.

18. The process of claim 16, wherein the first coating contains a release agent.

19. The process of claim 16, wherein the first coating contains essentially no elastomeric material.

20. The process of claim 16, wherein the aqueous polymer solution comprises at least about 60% water soluble polymer by dry weight, and up to 10% release agent by dry weight.

21. The process of claim 16, wherein the nipped contact has a dwell time and the dwell time is selected from one of the group consisting of between about 1 millisecond to about 60 milliseconds, between about 4 milliseconds to about 25 milliseconds, and between about 6 milliseconds to about 10 milliseconds.

22. The process of claim 16, wherein the nipped contact has a nip average pressure associated therewith, wherein the nip average pressure is between about 70 psi to about 700 psi.

23. The process of claim 16, further comprising the step of at least partially drying the film.

24. The process of claim 16, wherein the first coating includes a surface with a Sheffield Smoothness in a range selected from one of the group consisting of less than about 200 units and less than about 150 units.

25. A process for treating a substrate, comprising the steps of:

applying to the substrate a first coating of an aqueous polymer solution as a film, the film having an exposed outer film surface, wherein the first coating includes a water soluble polymer and a release agent, immobilization of the film by bringing it into contact for less than about 3 seconds with a heated surface with a temperature above about 150° C. so as to cause voids to form having a transverse dimension of more than 5 microns and occupying an area equivalent to more than 50% of the area of the exposed outer film surface, wherein the voids are defined by the first coating and substantially all of the voids are formed wholly encapsulated within the first coating, and wherein the step of immobilization includes at least partially drying the film.

26. The process of claim 25, wherein the aqueous polymer solution contains essentially no elastomeric material.

27. The process of claim 25, wherein the substrate includes at least one of cellulose, paper, paperboard, fabric, fibrous material, porous material, porous film, or polylactic acid.

28. The process of claim 25, wherein the water soluble polymer includes a cross linkable polymer.

29. The process of claim 25, wherein the first coating further comprises a cross linking agent, wherein the cross linking agent comprises at least one of borax, borates, aldehydes, ammonium salts, calcium compounds, and derivatives thereof.

30. The process of claim 25, wherein the first coating includes by dry weight at least about 60% water soluble polymer and up to 10% release agent.

31. The process of claim 25, wherein the first coating includes at least one of starch, waxy maize, protein, polyvinyl alcohol, casein, gelatin, soybean protein, and alginate.

32. The process of claim 25, wherein the release agent includes at least one of wax, petroleum wax, vegetable wax, animal wax, synthetic wax, fatty acid metal soap, metal stearates, long chain alkyl derivatives, fatty esters, fatty amides, fatty amines, fatty acids, fatty alcohols, polymers, polyolefins, silicone polymers, fluoropolymers, natural polymers, fluorinated compounds, fluorinated fatty acids, and combinations thereof.

33. The process of claim 25, further comprising the step of applying a second coating after at least partially drying the film.

34. A process for treating a substrate, comprising the steps of:

applying to the substrate a first coating of an aqueous polymer solution as a film, the film having an exposed outer film surface, wherein the first coating includes a water soluble polymer and essentially no elastomeric material;

immobilization of the film by bringing it into contact for less than about 3 seconds with a heated surface with a temperature above about 150° C. so that voids are formed having a transverse dimension of more than 5 microns and occupying an area equivalent to more than 50% of the area of the exposed outer film surface, wherein the voids are defined by the first coating and substantially all of the voids are formed wholly encapsulated within the first coating, and wherein the step of immobilization includes at least partially drying the film.

35. The process of claim 34, wherein the substrate includes at least one of cellulose, paper, paperboard, fabric, fibrous material, porous material, porous film, or polylactic acid.

36. The process of claim 34, wherein the water soluble polymer includes a cross linkable polymer.

37. The process of claim 34, wherein a cross linking agent is included in the first coating or applied to the first coating, before the film is brought into contact with the heated surface.

38. The process of claim 34, wherein the cross linking agent comprises at least one of borax, borates, aldehydes, ammonium salts, calcium compounds, and derivatives thereof.

39. The process of claim 34, wherein the first coating includes by dry weight at least about 60% water soluble polymer and up to 10% release agent.

40. The process of claim 39, wherein the release agent includes at least one of wax, petroleum wax, vegetable wax, animal wax, synthetic wax, fatty acid metal soap, metal stearates, long chain alkyl derivatives, fatty esters, fatty amides, fatty amines, fatty acids, fatty alcohols, polymers, polyolefins, silicone polymers, fluoropolymers, natural polymers, fluorinated compounds, fluorinated fatty acids, and combinations thereof.

41. The process of claim 34, wherein the first coating includes at least one of starch, waxy maize, protein, polyvinyl alcohol, casein, gelatin, soybean protein, and alginate.

42. The process of claim 34, further comprising the step of applying a second coating after at least partially drying the film.

43. A process for treating a substrate, comprising the steps of:

applying to the substrate a first coating of an aqueous polymer solution as a film, the film having an exposed outer film surface, immobilization of the film by bringing it into contact for less than about 3 seconds with a heated surface with a temperature above about 150° C. so that voids are formed having a transverse dimension of more than 5 microns and occupying an area equivalent to more than 50% of the area of the exposed outer film surface of the film, wherein the voids are defined by the first coating and substantially all of the voids are formed wholly encapsulated within the first coating, wherein the step of immobilization includes at least partially drying the film, wherein the exposed outer film surface after drying has a Sheffield Smoothness of less than about 300 units.

44. The process of claim 43, wherein the film is in contact with the heated surface for a time selected from one of the group consisting of less than about 2 seconds and less than about 0.5 seconds;

wherein the substrate comprises a web or a sheet and includes at least one of cellulose, paper, paperboard, fabric, fibrous material, porous material, porous film, or polylactic acid;

wherein the aqueous polymer solution includes a cross linkable polymer and essentially no elastomeric material;

wherein a cross linking agent is included in the first coating or applied to the first coating, before the film is brought into contact with the heated surface; wherein the cross linking agent comprises at least one of borax, borates, aldehydes, ammonium salts, calcium compounds, and derivatives thereof;

wherein the first coating includes by dry weight at least about 60% water soluble polymer and up to 10% release agent; wherein the release agent includes at least one of wax, petroleum wax, vegetable wax, animal wax, synthetic wax, fatty acid metal soap, metal stearates, long chain alkyl derivatives, fatty esters, fatty amides, fatty amines, fatty acids, fatty alcohols, polymers, polyolefins, silicone polymers, fluoropolymers, natural polymers, fluorinated compounds, fluorinated fatty acids, and combinations thereof;

wherein the first coating includes at least one of starch, waxy maize, protein, polyvinyl alcohol, casein, gelatin, soybean protein, and alginate;

wherein the first coating surface has a Sheffield Smoothness selected from one of the group consisting of less than about 200 units and less than about 150 units;

the process further comprising the step of applying a second coating after at least partially drying the film, wherein the second coating includes at least one of pigments, binders, and fillers.

45. A process for treating a substrate, comprising the steps of:

applying to the substrate a first coating of an aqueous polymer solution as a film, the film having an exposed outer film surface, wherein the first coating includes a water soluble polymer, a release agent, and essentially no elastomeric material, immobilization of the film by bringing it into contact for less than about 3 seconds with a heated surface with a temperature above about 150° C. so that voids are formed having a transverse dimension of more than 5 microns and occupying an area equivalent to more than 50% of the area of the exposed outer film surface, wherein the voids are defined by the first coating and substantially all of the voids are formed wholly encapsulated within the first coating, wherein the step of immobilization includes at least partially drying the film, wherein the exposed outer film surface after drying has a Sheffield Smoothness of less than about 300 units.

46. The process of claim 45, wherein the film is in contact with the heated surface for a time selected from the group consisting of less than about 2 seconds and less than about 0.5 seconds;

wherein the substrate comprises a web or a sheet and includes at least one of cellulose, paper, paperboard, fabric, fibrous material, porous material, porous film, or polylactic acid;

wherein the water soluble polymer includes a cross linkable polymer;

wherein a cross linking agent is included in the first coating or applied to the first coating, before the film is brought into contact with the heated surface;

wherein the cross linking agent comprises at least one of borax, borates, aldehydes, ammonium salts, calcium compounds, and derivatives thereof;

wherein the first coating includes by dry weight at least about 60% water soluble polymer and up to 10% release agent which includes at least one of wax, petroleum wax, vegetable wax, animal wax, synthetic wax, fatty acid metal soap, metal stearates, long chain alkyl derivatives, fatty esters, fatty amides, fatty amines, fatty acids, fatty alcohols, polymers, polyolefins, silicone polymers, fluoropolymers, natural polymers, fluorinated compounds, fluorinated fatty acids, and combinations thereof;

wherein the first coating includes at least one of starch, waxy maize, protein, polyvinyl alcohol, casein, gelatin, soybean protein, and alginate;

wherein the first coating surface has a Sheffield Smoothness selected from one of the group consisting of less than about 200 units or less than about 150 units;

the process further comprising the step of applying a second coating after at least partially drying the film, wherein the second coating includes at least one of pigments, binders, and fillers.

47. A process for treating a substrate, comprising the steps of:

providing a cellulosic substrate, applying to the substrate a film of aqueous polymer solution, the film having an exposed outer film surface, wherein the aqueous polymer solution comprises at least about 60% water soluble polymer by dry weight, and up to 10% release agent by dry weight, immobilization of the aqueous polymer solution by bringing it into contact for less than about 3 seconds with a heated surface with a temperature above about 150° C. so that voids are formed having a transverse dimension of more than 5 microns and occupying an area equivalent to more than 50% of the area of the exposed outer film surface, wherein the voids are defined by the film and substantially all of the voids are formed wholly encapsulated within the film, and wherein the step of immobilization includes at least partially drying the aqueous polymer solution.

48. A process for treating a substrate, comprising the steps of:

applying to the substrate a film of an aqueous polymer solution, the film having an exposed outer film surface, bringing the film into contact with a heated surface in a nip, the nip having a nip dwell time, a nip local pressure, and a nip average pressure, whereby during a first portion of the nip dwell time, the nip local pressure increases and the film undergoes heating with substantially no vapor formation, and during a second portion of the nip dwell time, the nip local pressure decreases and voids are formed having a transverse dimension of more than 5 microns and occupying an area equivalent to more than 50% of the area of the exposed outer film surface, wherein the voids are defined by the film and substantially all of the voids are formed wholly encapsulated within the film, and at least partially drying the film.

49. The process of claim 48, wherein the nip dwell time has a range of values selected from one of the group consisting of between about 1 millisecond and about 60 milliseconds, between about 4 milliseconds and about 25 milliseconds, and between about 6 milliseconds and about 10 milliseconds.

50. The process of claim 48, wherein the nip average pressure is between about 70 psi and about 700 psi.

51. The process of claim 48, wherein the heated surface is at a temperature above about 150° C.

52. A process for treating a substrate, comprising the steps of:

applying to the substrate a film of an aqueous polymer solution, the film having an exposed outer film surface;

heating the film under a first pressure with substantially no vapor formation; and reducing the first pressure so that voids are formed having a transverse dimension of more than 5 microns and occupying an area equivalent to more than 50% of the area of the exposed outer film surface, wherein the voids are defined by the film and substantially all of the voids are formed wholly encapsulated within the film.

53. The process of claim 52, wherein the film is heated by contact with a heated surface.

54. The process of claim 53, wherein the heated surface is at a temperature above about 150° C.

55. The process of claim 52, further comprising the step of at least partly drying the film.

56. The process of claim 52, wherein heating the film under the first pressure, and reducing the first pressure, occur at least partly in a pressure nip.

57. The process of claim 56, wherein the pressure nip is characterized by a nip average pressure between about 70 psi and about 700 psi.

58. The process of claim 56, wherein the pressure nip has a nip dwell time with a range selected from one of the group consisting of between about 1 millisecond and about 60 milliseconds, between about 4 milliseconds and about 25 milliseconds, and between about 6 milliseconds and about 10 milliseconds.

59. A process for treating a substrate, comprising the steps of:

applying to the substrate a first coating of an aqueous polymer solution as a film, the film having an exposed outer film surface;

wherein the first coating includes a water soluble polymer and a release agent, heating the film under a first pressure with substantially no vapor formation; and reducing the first pressure so that voids are formed having a transverse dimension of more than 5 microns and occupying an area equivalent to more than 50% of the area of the exposed outer film surface, wherein the voids are defined by the first coating and substantially all of the voids are formed wholly encapsulated within the first coating.

60. The process of claim 59, further comprising the step of at least partly drying the film.

61. The process of claim 59, wherein the film is heated by contact with a heated surface.

62. The process of claim 61, wherein the heated surface is at a temperature above about 150° C.

63. The process of claim 59, wherein heating the film under the first pressure, and reducing the first pressure, occur at least partly in a pressure nip.

64. The process of claim 63, wherein the pressure nip is characterized by a nip average pressure in the range selected from one of the group consisting of between about 70 psi to about 700 psi and between about 150 psi to about 550 psi.

65. The process of claim 63, wherein the pressure nip has a nip dwell time in a range selected from one of the group consisting of between about 1 millisecond to about 60 milliseconds, between about 4 milliseconds to about 25 milliseconds, and between about 6 milliseconds to about 10 milliseconds.

66. The process of claim 59, wherein the aqueous polymer solution contains essentially no elastomeric material.

67. The process of claim 59, wherein the substrate includes at least one of cellulose, paper, paperboard, fabric, fibrous material, porous material, porous film, or polylactic acid.

68. The process of claim 59, wherein the first coating includes by dry weight at least about 60% water soluble polymer and up to 10% release agent.

69. The process of claim 59, wherein the first coating includes at least one of starch, waxy maize, protein, polyvinyl alcohol, casein, gelatin, soybean protein, and alginate.

70. The process of claim 59, further comprising the step of applying a second coating after at least partially drying the film.

71. The process of claim 59, wherein the substrate comprises a web or a sheet.

72. A process for treating a substrate, comprising the steps of:

applying to the substrate a first coating of an aqueous polymer solution as a film, wherein the substrate is a cellulosic substrate;

bringing the film into contact for less than about 3 seconds with a heated surface having a temperature above about 150° C., wherein the contact comprises a nipped contact with the heated surface wherein the nipped contact has a nip average pressure associated therewith, wherein the nip average pressure is between about 70 psi to about 700 psi, wherein the nipped contact with the heated surface comprises a nip dwell time with a range selected from the group of between about 1 millisecond to about 60 milliseconds, between about 4 milliseconds and about 25 milliseconds, and between about 6 milliseconds and about 10 milliseconds;

heating the film under a first pressure with substantially no vapor formation;

reducing the first pressure so that the aqueous polymer solution boils and forms voids that remain in the film, and at least partially drying the film;

wherein the first coating includes a water soluble polymer containing a release agent and essentially no elastomeric material;

wherein the aqueous polymer solution comprises at least about 60% water soluble polymer by dry weight, and up to 10% release agent by dry weight, wherein the first coating includes an exposed outer surface and voids;

wherein the voids are defined by the first coating and substantially all of the voids are formed wholly encapsulated within the first coating, the voids having a transverse dimension of more than 5 microns and occupying an area equivalent to more than 50% of the area of the exposed outer surface, and wherein the exposed outer surface has a Sheffield Smoothness selected from the group consisting of less than about 300 units, less than about 200 units, and less than about 150 units.

* * * * *